US011208128B2

(12) United States Patent
Hagiwara et al.

(10) Patent No.: US 11,208,128 B2
(45) Date of Patent: Dec. 28, 2021

(54) COURSE CONTROL DEVICE, WIRELESS TRAIN CONTROL SYSTEM, ON-BOARD DEVICE, COURSE CONTROL METHOD, AND RECORDING MEDIUM

(71) Applicant: Mitsubishi Electric Corporation, Tokyo (JP)

(72) Inventors: Masashi Hagiwara, Tokyo (JP); Atsushi Takami, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 355 days.

(21) Appl. No.: 16/476,325

(22) PCT Filed: Jan. 17, 2017

(86) PCT No.: PCT/JP2017/001407
§ 371 (c)(1),
(2) Date: Jul. 8, 2019

(87) PCT Pub. No.: WO2018/134890
PCT Pub. Date: Jul. 26, 2018

(65) Prior Publication Data
US 2019/0351919 A1 Nov. 21, 2019

(51) Int. Cl.
*B61L 3/12* (2006.01)
*B61L 23/16* (2006.01)
*G05D 1/02* (2020.01)

(52) U.S. Cl.
CPC .............. *B61L 3/127* (2013.01); *B61L 23/16* (2013.01); *G05D 1/0276* (2013.01); *G05D 1/0289* (2013.01)

(58) Field of Classification Search
CPC .......... B61L 3/127; B61L 23/16; B61L 23/14; B61L 15/0027; B61L 27/0077;
(Continued)

(56) References Cited

U.S. PATENT DOCUMENTS 8,467,920 B2 6/2013 Asuka et al.
2011/0108677 A1* 5/2011 Asuka ..................... B61L 23/14
246/27
(Continued)

FOREIGN PATENT DOCUMENTS

CN 104205883 A 12/2014
JP S57-138468 8/1982
(Continued)

OTHER PUBLICATIONS

Office Action dated Oct. 26, 2020, issued in corresponding Chinese Patent Application No. 201780083252.7, 72 pages including 42 pages of English translation.
(Continued)

*Primary Examiner* — Donald J Wallace
(74) *Attorney, Agent, or Firm* — Buchanan Ingersoll & Rooney PC

(57) ABSTRACT

A course control device includes: an information acquisition unit to acquire information via any of wireless devices arranged along a track from a first station to a second station; and a course control unit to control the course of a course control target train based on the information acquired by the information acquisition unit. The course control unit prevents the course control target train from proceeding to the course in at least one of a case where at least one of the wireless devices is in a failure state, a case where an on-board device that is mounted in a preceding train preceding the course control target train on the track and controls the preceding train based on information acquired via the wireless devices is in a failure state, and a case where the preceding train is in a stationary state between the first station and the second station.

26 Claims, 13 Drawing Sheets

(58) Field of Classification Search
CPC ... B61L 3/125; B61L 27/0038; G05D 1/0276; G05D 1/0289
See application file for complete search history.

(56) References Cited

U.S. PATENT DOCUMENTS

| | | | |
|---|---|---|---|
| 2016/0039437 A1* | 2/2016 | Miyajima | B61L 27/0077 701/19 |
| 2019/0315382 A1* | 10/2019 | Tokumaru | B61L 3/12 |

FOREIGN PATENT DOCUMENTS

| | | |
|---|---|---|
| JP | S62-77277 A | 4/1987 |
| JP | 2001063577 A | 3/2001 |
| JP | 2009241661 A | 10/2009 |
| JP | 2011116212 A | 6/2011 |
| JP | 2013082450 A | 5/2013 |
| JP | 2013119290 A | 6/2013 |
| JP | 2013212712 A | 10/2013 |
| JP | 2014083901 A | 5/2014 |
| JP | 2014088098 A | 5/2014 |
| WO | 2013146426 A1 | 10/2013 |

OTHER PUBLICATIONS

Office Action dated Jul. 21, 2020, issued in corresponding Indian Patent Application No. 201947027266, 6 pages.
International Search Report (PCT/ISA/210) dated Apr. 25, 2017, by the Japan Patent Office as the International Searching Authority for International Application No. PCT/JP2017/001407.
Japanese Office Action (Notification of Reasons for Refusal) dated Jul. 25, 2017, issued in Japanese Patent Application No. 2017-534764, and a English Translation thereof. (9 pages).
Written Opinion (PCT/ISA/237) dated Apr. 25, 2017, by the Japan Patent Office as the International Searching Authority for International Application No. PCT/JP2017/001407.

* cited by examiner

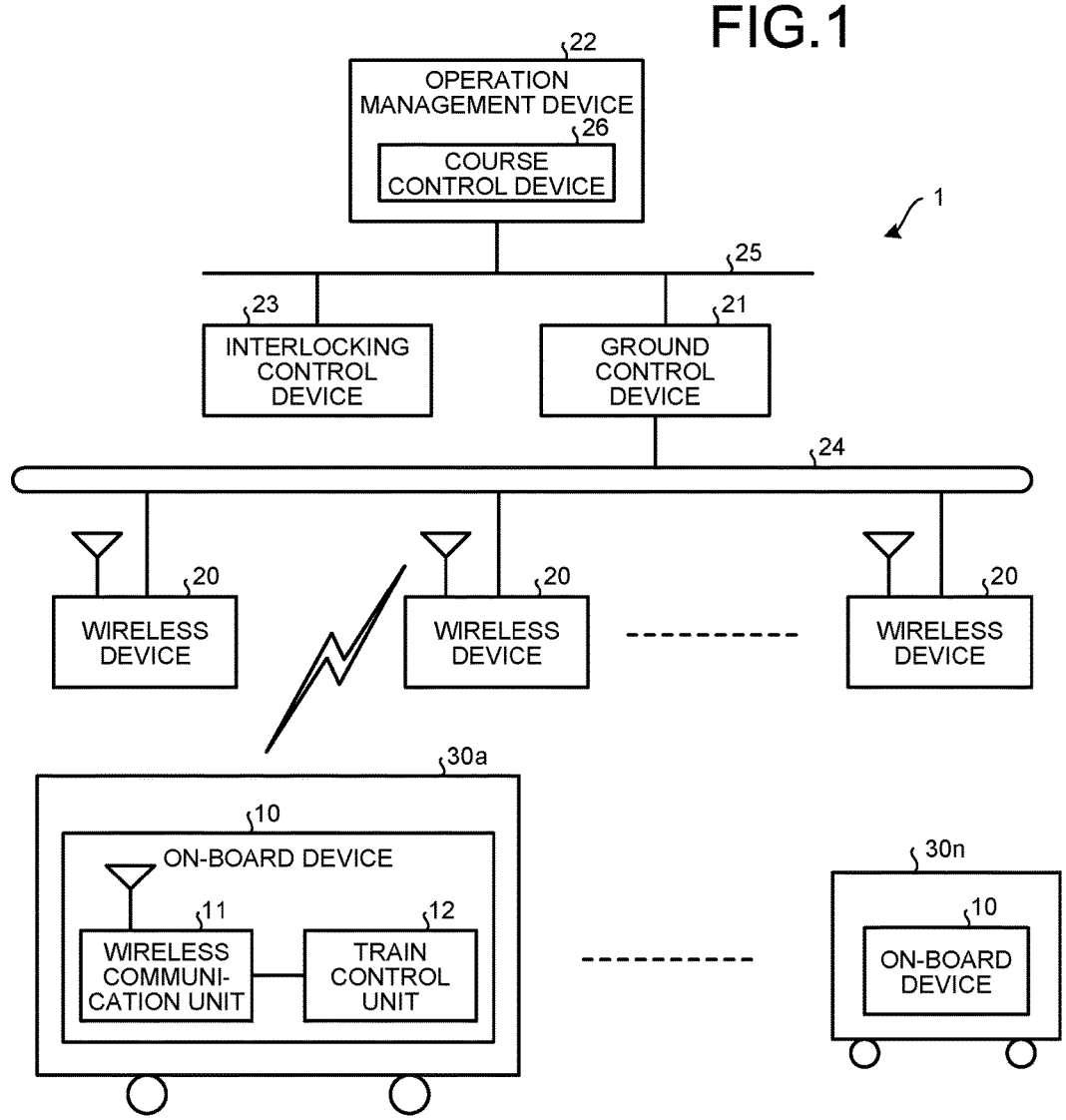
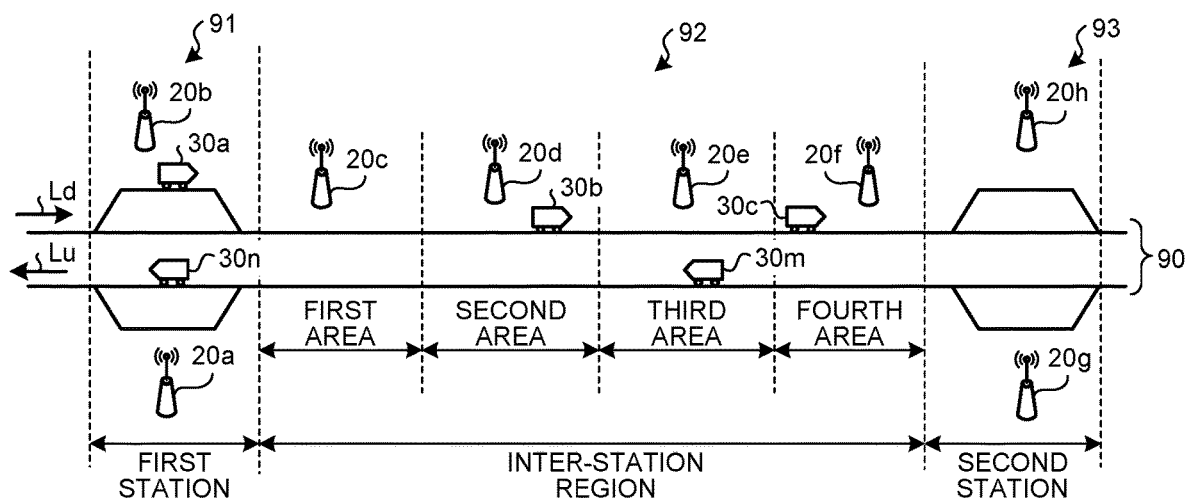

| ROUTE ID | TRAVELING DIRECTION | BLOCK ID | COURSE ID |
|---|---|---|---|
| R1001 | OUTBOUND | ···,B999,B1002,B1003,B1004 | 1SA |
| R1002 | OUTBOUND | ···,B998,B1001,B1004 | 1SB |
| R1003 | OUTBOUND | B1005,1006,B1007,B1008 | - |
| R1004 | OUTBOUND | B1005,1006,B1007,B1008,B1009,B1010,B2001,··· | 1RB |
| R1005 | OUTBOUND | B1005,1006,B1007,B1008,B1009,B1011,B1012,B2002,··· | 1RA |
| ⋮ | ⋮ | ⋮ | ⋮ |

| TRAIN ID | TRAVEL ROUTE INFORMATION |
|---|---|
| T1001 | ···,R1001,R1004,··· |
| T1002 | ···,R1002,R1005,··· |
| ⋮ | ⋮ |

FIG.9

| DEVICE ID | BLOCK ID |
|---|---|
| W2001 | B1001,R1004 |
| W2002 | B1002,B1003,R1004 |
| W2003 | B1005 |
| W2004 | B1006 |
| W2005 | B1007 |
| W2006 | B1008 |
| W2007 | B1009,B1010 |
| W2008 | B1009,B1011,B1012 |
| ⋮ | ⋮ |

FIG.10

| DEVICE ID | FAILURE FLAG |
|---|---|
| W1001 | 0 |
| W1002 | 0 |
| ⋮ | ⋮ |
| W2001 | 0 |
| W2002 | 0 |
| W2003 | 1 |
| ⋮ | ⋮ |

COURSE CONTROL DEVICE, WIRELESS TRAIN CONTROL SYSTEM, ON-BOARD DEVICE, COURSE CONTROL METHOD, AND RECORDING MEDIUM

FIELD

The present invention relates to a course control device, a wireless train control system, an on-board device, a course control method, and a recording medium for controlling the course of a train.

BACKGROUND

Conventionally, a wireless train control system called communications-based train control (CBTC) is known. The wireless train control system includes a ground device, and the ground device exchanges information, through wireless communication, with an on-board device mounted in a train via a wireless device arranged along the track on which the train travels, thereby controlling the operation of the train.

In the wireless train control system, a wireless device or an on-board device can sometimes fail. In view of this, Patent Literature 1 has proposed a technique in which, in a case where a ground device cannot acquire the train position information on a preceding train due to a failure of a wireless device or a failure of the on-board device, the ground device stops the following train in the section just before the section in which the preceding train is located.

CITATION LIST

Patent Literature

Patent Literature 1: Japanese Patent Application Laid-open No. 2014-88098

SUMMARY

Technical Problem

However, the above-described conventional technique has a problem: a plurality of trains stays between stations until the wireless device or on-board device is recovered from failure. The conventional technique also has another problem: in the case of a failure of a wireless device whose wireless communication range includes the premises of a station or a failure of the on-board device of a train located in the premises of a station, trains enter and stay in the premises of the station.

The present invention has been made in view of the above, and an object thereof is to obtain a course control device capable of preventing a train from at least one of staying between stations and staying in the premises of a station.

Solution to Problem

In order to solve the above problem and achieve the object, a course control device according to an aspect of the present invention includes: an information acquisition unit to acquire information via any of a plurality of wireless devices arranged along a track from a first station to a second station; and a course control unit to control the course of the course control target train on a basis of the information acquired by the information acquisition unit. The course control unit prevents the course control target train from proceeding to the course in at least one of a case where at least one of the plurality of wireless devices is in a failure state, a case where an on-board device that is mounted in a preceding train preceding the course control target train on the track and controls the preceding train on a basis of information acquired via the wireless devices is in a failure state, and a case where the preceding train is in a stationary state between the first station and the second station.

Advantageous Effects of Invention

The present invention can achieve the effect of preventing a train from at least one of staying between stations and staying in the premises of a station.

BRIEF DESCRIPTION OF DRAWINGS

FIG. 1 is a diagram illustrating a configuration of a wireless train control system according to a first embodiment.

FIG. 2 is a diagram illustrating the relationship between a track and a plurality of wireless devices according to the first embodiment.

FIG. 9 is a diagram illustrating an example of a wireless device information table according to the first embodiment.

FIG. 10 is a diagram illustrating an example of a device state information table according to the first embodiment.

DESCRIPTION OF EMBODIMENTS

Figures 3, 4:
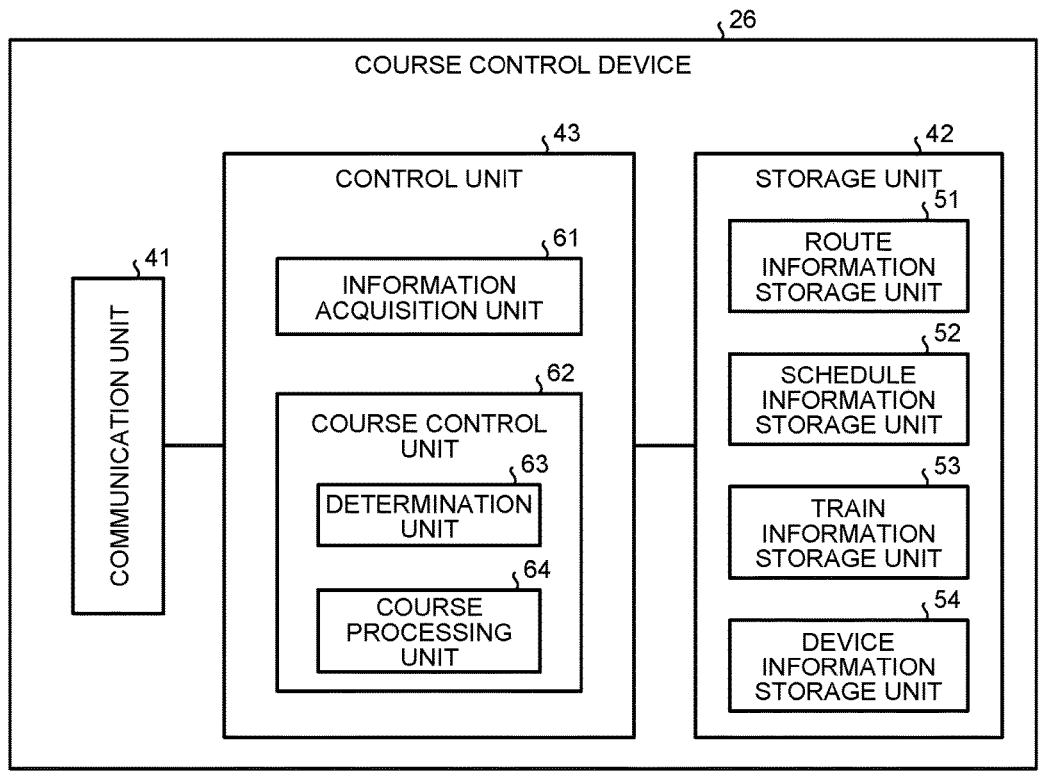
FIG. 3 is a diagram illustrating an exemplary configuration of a course control device according to the first embodiment.
FIG. 4 is a diagram illustrating a route information table according to the first embodiment.

Hereinafter, a course control device, a wireless train control system, an on-board device, a course control method, and a recording medium according to embodiments of the present invention will be described in detail with reference to the drawings. The present invention is not limited to the embodiments.

First Embodiment

FIG. 1 is a diagram illustrating a configuration of a wireless train control system 1 according to a first embodiment of the present invention. The wireless train control system 1 illustrated in FIG. 1 includes a plurality of on-board devices 10, a plurality of wireless devices 20, a ground control device 21, an operation management device 22, and an interlocking control device 23. The operation management device 22 is a device for managing the operation of a plurality of trains 30a to 30n traveling on a track of a line including a plurality of stations. The operation management device 22 includes a course control device 26 for controlling the course of each of the trains 30a to 30n. In the following description, the course control device 26 of the operation management device 22 will be described, and descriptions of components of the operation management device 22 other than the course control device 26 will be omitted.

The plurality of wireless devices 20 and the ground control device 21 are communicably connected to one another via a network 24. The ground control device 21, the course control device 26, and the interlocking control device 23 are communicably connected to one another via a network 25. Each of the networks 24 and 25 is an intranet, but may be the Internet or a network other than an intranet and the Internet.

In the example illustrated in FIG. 1, the wireless train control system 1 controls the operation of the trains 30a to 30n, but the wireless train control system 1 may control some of the trains 30a to 30n instead of controlling all the trains 30a to 30n, or may control other trains in addition to the trains 30a to 30n. Hereinafter, the trains 30a to 30n may be generically referred to as the train(s) 30.

The trains 30a to 30n are each equipped with the on-board device 10, and the operation of each train 30 is controlled by the on-board device 10. The on-board device 10 includes a wireless communication unit 11 that performs wireless communication with the wireless devices 20 and a train control unit 12 that controls the train 30. The train control unit 12 detects the current position of the train 30 and outputs position information indicating the detected current position to the wireless communication unit 11. The wireless communication unit 11 acquires position information from the train control unit 12 and outputs a wireless signal including the acquired position information to an external device. Hereinafter, position information indicating the current position of the train 30 is referred to as train position information. Note that the train position information may include information indicating the speed of the train 30.

The train control unit 12 detects the current position of the train 30 on the basis of the wheel rotation speed detected by a rotation detector (not illustrated) provided in the train 30. Alternatively, the train control unit 12 can detect the current position of the train 30 on the basis of the position information output from a global positioning system (GPS) receiver (not illustrated) provided in the train 30.

The wireless communication unit 11 receives a wireless signal transmitted from the wireless device 20 and outputs train control information included in the wireless signal to the train control unit 12. The train control unit 12 acquires train control information from the wireless communication unit 11 and controls the train 30 on the basis of the acquired train control information. The train control information includes route information and stop position information on the train 30. The route information includes information for identifying the route along which the train 30 travels. The stop position information includes information indicating a stop limit position at which the train 30 is to be stopped. The train 30 can travel along the route to the stop limit position. The stop limit position is set at the terminal end of the route if there is no preceding train and other obstructions on the route. If a proceed sign is not given to a departure course or in-premise course, the stop limit position is set before the course.

The plurality of wireless devices 20 are arranged along the track on which the train 30 travels. FIG. 2 is a diagram illustrating the relationship between a track 90 and the plurality of wireless devices 20 according to the first embodiment. In the example illustrated in FIG. 2, the eight wireless devices 20 arranged in the area between a first station 91 and a second station 93 are represented as wireless devices 20a to 20h, but the number of wireless devices 20 is not limited to eight. In the following description, control processes for the area between the first station 91 and the second station 93 will mainly be described, but similar control processes are executed for areas including other stations.

The wireless devices 20a to 20h are allocated their wireless communication ranges in different areas between the first station 91 and the second station 93. Specifically, the wireless communication range of the wireless device 20a includes the inbound line Lu in the premises of the first station 91 and a partial area of the outbound line Ld in the premises of the first station 91, and the wireless communication range of the wireless device 20b includes a partial area of the outbound line Ld in the premises of the first station 91. The wireless devices 20c to 20f are arranged at intervals along the track 90 in an inter-station region 92, which is the area between the first station 91 and the second station 93 and whose ends are continuous with the first station 91 and the second station 93. The wireless communication ranges of the wireless devices 20c to 20f include different areas, i.e. the first to fourth areas obtained by dividing the inter-station region 92 into four.

The wireless communication range of the wireless device 20g includes the area of the inbound line Lu in the premises of the second station 93 and a partial area of the outbound line Ld in the premises of the second station 93, and the wireless communication range of the wireless device 20h includes a partial area of the outbound line Ld in the premises of the second station 93. The wireless devices 20a to 20h perform wireless communication with the on-board devices 10 present in the respective wireless communication ranges. Two or more wireless devices 20 may have partially overlapping wireless communication ranges.

Each of the wireless devices 20 relays transmission and reception of information between the on-board devices 10 and the ground control device 21. For example, the wireless device 20 receives a wireless signal transmitted from the on-board device 10 of the train 30 and transmits the train position information included in the wireless signal to the ground control device 21. When acquiring, from the ground control device 21, train control information for the train 30 present in the wireless communication range of the wireless device 20, the wireless device 20 transmits a wireless signal including the acquired train control information.

The ground control device 21 acquires train position information from the wireless device 20, acquires the current position of each train 30 on the basis of the acquired train position information, and generates train control information for each train 30 as described later. The ground control device 21 outputs the train position information and train control information on each train 30 to the course control device 26.

The course control device 26 acquires the train position information and train control information on each train 30 from the ground control device 21. On the basis of the acquired train position information and train control information on each train 30 and schedule information stored, the course control device 26 generates course control information for each train 30 such that the train 30 travels on course and on time according to the schedule information. The course control information includes information for identifying a course and information indicating whether to cause the train 30 to proceed to the course. The course control device 26 outputs the course control information generated for each train 30 to the interlocking control device 23.

On the basis of the course control information on each train 30 output from the course control device 26, the interlocking control device 23 locks or unlocks turnout switches (not illustrated) to form the course of each train 30. The interlocking control device 23 also generates signal information for each train 30 on the basis of the course control information on each train 30 output from the course control device 26, and outputs the signal information to the ground control device 21.

The ground control device 21 generates the above-described train control information for each train 30 on the basis of the signal information transmitted from the interlocking control device 23. On the basis of the train position information and signal information on the train 30, the ground control device 21 generates route information indicating a route that the train 30 can take. The ground control device 21 also generates stop position information on the basis of preceding trains and other obstructions present on the route, and adds the generated stop position information to the route information, thereby generating train control information.

The ground control device 21 transmits the train control information to the on-board device 10 of the train 30 via the wireless device 20 whose wireless communication range includes the area in which the train 30 is located. For example, the ground control device 21 transmits, to the on-board device 10 of the train 30b, the train control information for the train 30b present in the second area illustrated in FIG. 2 using the wireless device 20d whose wireless communication range includes the second area.

The course control device 26 described above can perform, on each train 30, course control processes including course restriction processes. The course restriction processes include a departure restriction process and an entry restriction process. Since the course control device 26 performs similar course control processes on each train 30, the following paragraphs will mainly describe course control processes for the train 30a in the area between the first station 91 and the second station 93 illustrated in FIG. 2. In the following description, the train 30a to be subjected to course control is also referred to as a control target train 30a, and the train 30b preceding the train 30a illustrated in FIG. 2 on the track 90 from the first station 91 to the second station 93 is also referred to as a preceding train 30b.

First, the departure restriction process will be described. Information on departure restriction conditions is set in the course control device 26. If a departure restriction condition is satisfied in course control processes for the control target train 30a, the course control device 26 prevents the control target train 30a from proceeding to a departure course of the first station 91. The departure course is a course for the train 30 to enter the inter-station region 92 from the platform of the first station 91.

Departure restriction conditions indicate specific environmental states in which the control target train 30a is presumed to stay in the inter-station region 92 or at the second station 93 if the control target train 30a proceeds to the departure course of the first station 91. A specific environmental state is a state in which one or more of the plurality of wireless devices 20 whose wireless communication range includes the inter-station region 92 or the second station 93 have failed, a state in which the on-board device 10 of the preceding train 30b has failed in the inter-station region 92 or at the second station 93, or a state in which the preceding train 30b is stationary in the inter-station region 92.

When a departure restriction condition is satisfied, the course control device 26 does not output, to the interlocking control device 23, the course control information corresponding to the departure course of the first station 91. Therefore, the interlocking control device 23 notifies the ground control device 21 of signal information indicating a stop sign as the signal information for the departure course of the first station 91. The ground control device 21 generates train control information in which information indicating a position before the departure course of the first station 91 is set as stop position information, and notifies the on-board device 10 of the control target train 30a of the train control information. As a result, the control target train 30a is prevented from proceeding to the departure course of the first station 91.

Next, the entry restriction process will be described. Information on entry restriction conditions is set in the course control device 26. If an entry restriction condition is satisfied in course control processes for the control target train 30a, the course control device 26 prevents the control target train 30a from proceeding to an in-premise course of the second station 93. The in-premise course is a course for the train 30 to enter the platform of the second station 93 from the inter-station region 92.

Entry restriction conditions indicate specific environmental states in which the control target train 30a is presumed to stay in the premises of the second station 93 if the control target train 30a located in the inter-station region 92 proceeds to the in-premise course of the second station 93. A specific environmental condition is a state in which a wireless device 20 whose wireless communication range includes the second station 93 has failed or a state in which the on-board device 10 of the preceding train 30b has failed in the premises of the second station 93.

When an entry restriction condition is satisfied, the course control device 26 does not output, to the interlocking control device 23, the course control information corresponding to the in-premise course of the second station 93. Therefore, the interlocking control device 23 notifies the ground control device 21 of signal information indicating a stop sign as the signal information for the in-premise course of the second station 93. The ground control device 21 generates train control information in which information indicating a position before the in-premise course of the second station 93 is set as stop position information, and notifies the on-board device 10 of the control target train 30a of the train control information. As a result, the control target train 30a is prevented from proceeding to the in-premise course of the second station 93.

As described above, in the case of a specific environmental state in which the control target train 30a is presumed to stay in the inter-station region 92 or at the second station 93 if the control target train 30a proceeds to a course, the course control device 26 prevents the control target train 30a from departing from the first station 91 toward the second station 93 or entering the second station 93. Therefore, it is possible to prevent the train 30 from staying between the stations and in the premises of the stations. The course control device 26 may execute, as a course restriction process, only prevention of departure from the first station 91 toward the second station 93 or prevention of entry into the second station 93. Hereinafter, the course control device 26 will be described in more detail.

FIG. 3 is a diagram illustrating an exemplary configuration of the course control device 26 according to the first embodiment. As illustrated in FIG. 3, the course control device 26 includes a communication unit 41, a storage unit 42, and a control unit 43. The communication unit 41 is connected to the network 25 and exchanges information with the ground control device 21 and the interlocking control device 23 over the network 25.

The storage unit 42 stores various kinds of information necessary for control processing in the control unit 43. The storage unit 42 includes a route information storage unit 51, a schedule information storage unit 52, a train information storage unit 53, and a device information storage unit 54.

The route information storage unit 51 stores a route information table 75. The route information table 75 includes unit route information about a plurality of unit routes. FIG. 4 is a diagram illustrating an example of the route information table 75. The route information table 75 illustrated in FIG. 4 is information in which "route ID", "traveling direction", "block ID", and "course ID" are associated with one another.

"Route ID" is identification information uniquely assigned to each unit route. A unit route is a minimum route unit including one or more blocks. A plurality of unit routes are combined to form a traveling route of the train 30. A block is a division of the track 90 and is also called a section.

"Traveling direction" is the traveling direction of the train 30 on a unit route. Either "inbound" or "outbound" is set as the "traveling direction". Although the route information table 75 illustrated in FIG. 4 shows only unit route information with the outbound traveling direction, the route information table 75 also includes unit route information with the inbound traveling direction.

"Block ID" is identification information uniquely assigned to a block included in a unit route. "Course ID" is identification information uniquely assigned to each course. Types of courses include departure courses and in-premise courses as described above. The departure courses with course IDs 1SA and 1SB are courses for entry into the inter-station region 92 from the platform of the first station 91. In the case of the second station 93, the in-premise courses with course IDs 1RA and 1RB are courses for entry into the second station 93 from the inter-station region 92.

Figure 5:
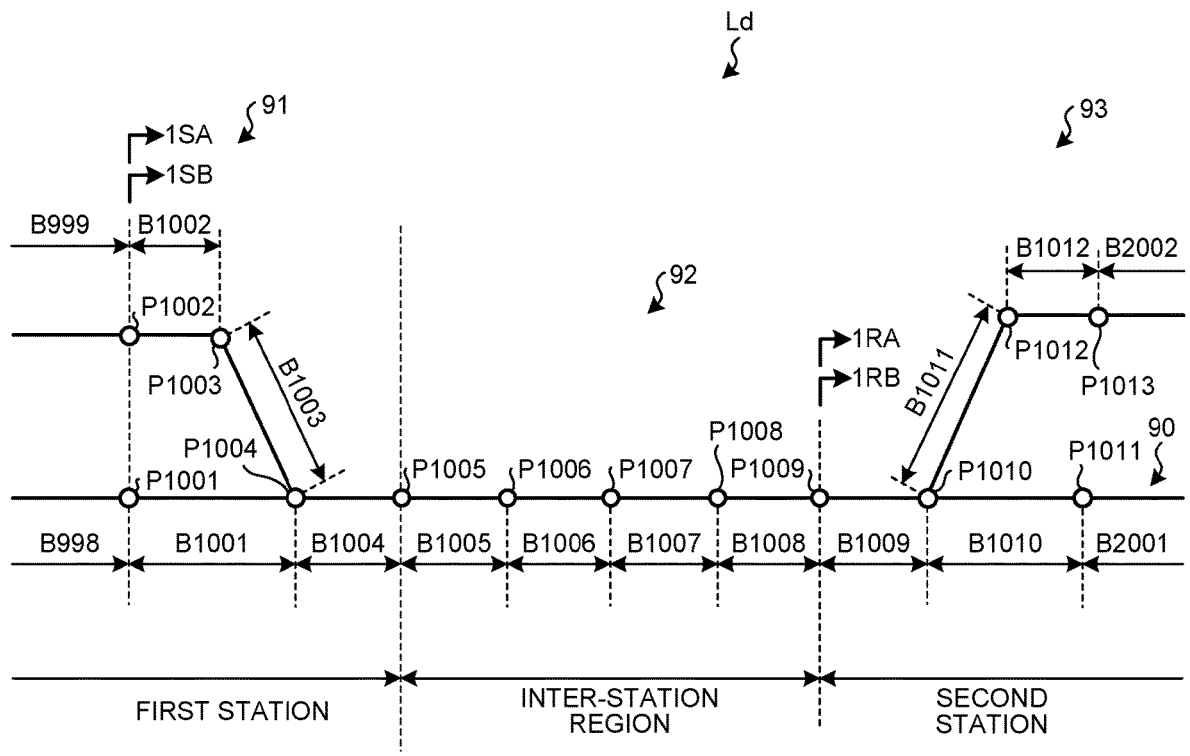
FIG. 5 is a diagram illustrating an exemplary relationship between blocks, departure courses, and in-premise courses according to the first embodiment.

FIG. 5 is a diagram illustrating an exemplary relationship between blocks, departure courses, and in-premise courses. FIG. 5 illustrates sixteen blocks with block IDs B998, B999, B1001 to B1012, B2001, and B2002, two departure courses with course IDs 1SA and 1SB, and two in-premise courses with course IDs 1RA and 1RB on the track 90 of the outbound line Ld. The two departure courses are selectively formed by locking or unlocking a turnout switch (not illustrated) provided between the platform of the first station 91 and the inter-station region 92. Similarly, the two in-premise courses are selectively formed by locking or unlocking a turnout switch (not illustrated) provided between the inter-station region 92 and the platform of the second station 93. The turnout switches are controlled by the interlocking control device 23.

In the example illustrated in FIG. 5, the blocks with block IDs B998, B999, and B1001 to B1004 are located in the premises of the first station 91, and the blocks with block IDs B1005 to B1008 are located in the inter-station region 92. The blocks with block IDs B1009 to B1012, B2001, and B2002 are located in the premises of the second station 93.

Each block is defined by a start end position and a terminal end position. For example, the start end position and the terminal end position of the block with block ID B1001 are positions P1001 and P1004, respectively. The start end position and the terminal end position of the block with block ID B1011 are positions P1010 and P1012, respectively.

Figure 6:
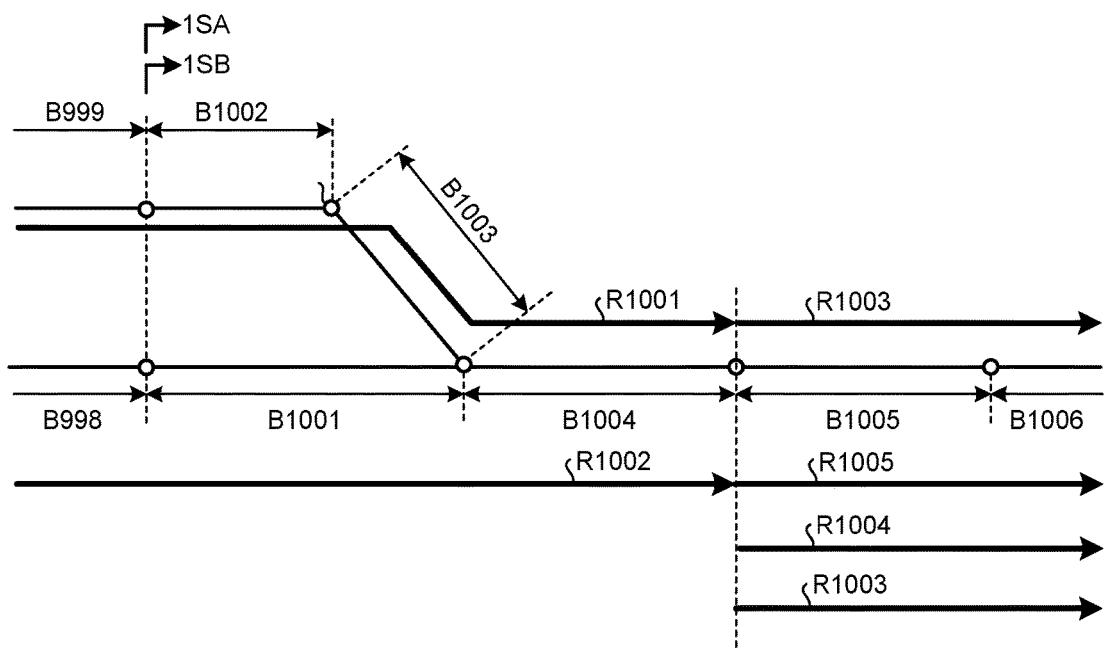
FIG. 6 is a diagram illustrating the relationship between blocks and routes according to the first embodiment.
Figures 7, 8:
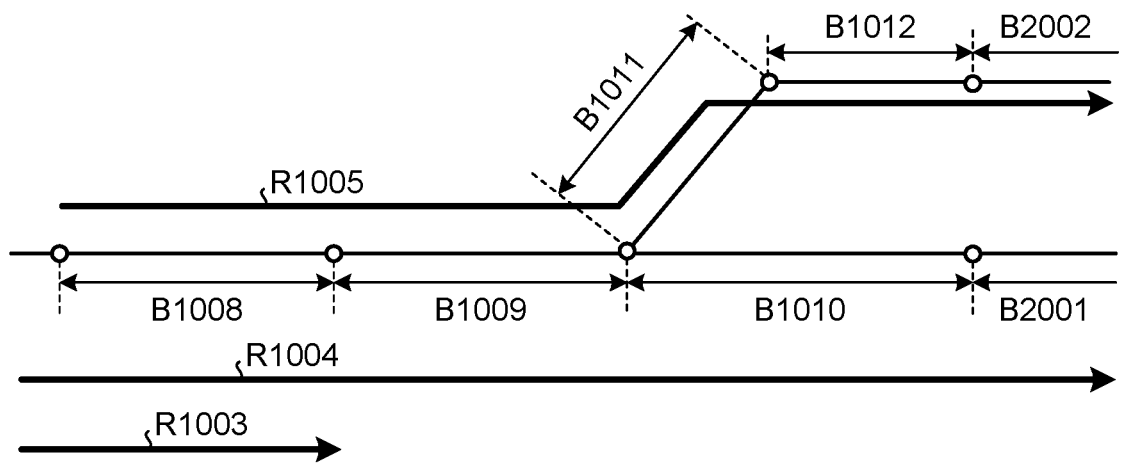
FIG. 7 is a diagram illustrating the relationship between blocks and routes according to the first embodiment.
FIG. 8 is a diagram illustrating a part of schedule information according to the first embodiment.

FIGS. 6 and 7 are diagrams illustrating the relationship between blocks and routes. As illustrated in FIGS. 4 and 6, the route with route ID R1001 includes the blocks with block IDs B999 and B1002 to B1004 and the departure course with course ID 1SA. The route with route ID R1002 includes the blocks with block IDs B999, B1001, and B1004 and the departure course with course ID 1SB.

As illustrated in FIGS. 4, 6, and 7, the route with route ID R1003 includes the blocks with block IDs B1005 to B1008, and does not include a departure course and an in-premise course. The route with route ID R1004 includes the blocks with block IDs B1005 to B1010 and B2001 and the in-premise course with route ID 1RB. The route with route ID R1005 includes the blocks with block IDs B1005 to B1009, B1011, B1012, and B2002 and the in-premise course with route ID 1RA.

Returning to FIG. 3, the description of the storage unit 42 is continued. The schedule information storage unit 52 of the storage unit 42 stores schedule information. The schedule information includes train operation information for each train 30. The train operation information includes a train ID, travel route information, and station time information indicating the time of arrival at each station and the time of departure from each station. A train ID is identification information uniquely assigned to each train 30. Each train 30 is identified by a train ID. Travel route information includes information on the above-mentioned route IDs of a plurality of routes on which each train 30 travels from the starting station to the last station.

FIG. 8 is a diagram illustrating a part of the schedule information. In the schedule information illustrated in FIG. 8, the travel route information on the train 30 with train ID T1001 includes the routes with route IDs R1001 and R1004, and the travel route information on the train 30 with train ID T1002 includes the routes with route IDs R1002 and R1005. From the schedule information illustrated in FIG. 8, some information including station time information is omitted.

Returning to FIG. 3, the description of the storage unit 42 is continued. The train information storage unit 53 of the storage unit 42 stores the train information on each train 30. The train information is information provided by the ground control device 21 as described above, and includes train position information and train control information. In the train information storage unit 53, past train information and current train information are stored.

The device information storage unit 54 stores a wireless device information table 76 including information on the wireless devices 20. FIG. 9 is a diagram illustrating an example of the wireless device information table 76. The wireless device information table 76 illustrated in FIG. 9 is information in which "device ID" and "block ID" are associated with each other. "Device ID" is identification information uniquely assigned to each wireless device 20, and "block ID" is the block ID of a block located within the wireless communication range of each wireless device 20. Hereinafter, a block located within the wireless communication range of each wireless device 20 is referred to as a communication target block.

In the example illustrated in FIG. 9, the wireless device IDs of the wireless devices 20a to 20h illustrated in FIG. 2 are represented by W2001 to W2008. The two blocks with block IDs B1001 and B1004 are communication target blocks for the wireless device 20a. The wireless device 20a performs wireless communication with the on-board devices 10 of the trains 30 located in the communication target blocks. Like the wireless device 20a, the wireless devices 20b to 20h have the communication target blocks illustrated in FIG. 9, and perform wireless communication with the on-board devices 10 of the trains 30 present in the communication target blocks.

The device information storage unit 54 stores a device state information table 77 including device information indicating the state of the on-board devices 10 and the wireless devices 20. FIG. 10 is a diagram illustrating an example of the device state information table 77. In the device state information table 77 illustrated in FIG. 10, "device ID" and "failure flag" are associated with each other. "Device ID" illustrated in FIG. 10 is identification information uniquely assigned to each on-board device 10 and each wireless device 20. The device IDs of the on-board devices 10 are the same as the device IDs illustrated in FIG. 9. In FIG. 10, the device IDs of the on-board devices 10 are W1001 and W1002.

"Failure flag" is information indicating whether the wireless device 20 is in a failure state. Failure flag "1" indicates that the on-board device 10 or the wireless device 20 is in a failure state, and failure flag "0" indicates that the on-board device 10 or the wireless device 20 is not in a failure state. The example illustrated in FIG. 10 indicates that the on-board device 10 with device ID W2003 is in a failure state.

The on-board device 10 is considered to be in a failure state if the wireless communication unit 11 fails and cannot wirelessly communicate with the wireless device 20 or if the train control unit 12 fails and cannot exchange information with the wireless device 20. The wireless device 20 is considered to be in a failure state if the communication unit of the wireless device 20 fails and cannot wirelessly communicate with the on-board device 10 or if the communication unit of the wireless device 20 fails and cannot exchange information with the ground control device 21. The above-mentioned failure is not only a failure caused by hardware but also a failure caused by a program. The device state information table 77 may further include information indicating the causes and kinds of failures (not illustrated in FIG. 10).

The ground control device 21 determines the failure of the wireless device 20 by communicating with the wireless device 20, and determines the failure of the on-board device 10 by communicating with the on-board device 10 via the wireless device 20. When the ground control device 21 cannot normally communicate with the wireless device 20, the ground control device 21 determines that the wireless device 20 is in a failure state. When the ground control device 21 cannot normally communicate with the on-board device 10 via the wireless device 20, the ground control device 21 determines that the on-board device 10 is in a failure state. At least one of the on-board device 10 and the wireless device 20 has a diagnostic function for diagnosing a failure of the device, and can transmit failure information indicating a failure state to the ground control device 21 when a failure occurs in the device. The ground control device 21 can determine that at least one of the on-board device 10 and the wireless device 20 is in a failure state on the basis of the failure information indicating the failure state.

Returning to FIG. 3, the description of the course control device 26 is continued. As illustrated in FIG. 3, the control unit 43 of the course control device 26 includes an information acquisition unit 61 and a course control unit 62. The information acquisition unit 61 acquires train information from the ground control device 21, and stores the acquired train information in the train information storage unit 53. The information acquisition unit 61 also acquires device information indicating the state of the on-board devices 10 and the state of the wireless devices 20 from the ground control device 21, and updates the device state information table 77 on the basis of the acquired information.

The ground control device 21 monitors the state of the on-board devices 10 and the state of the wireless devices 20 by communicating with the on-board devices 10 and the wireless devices 20. On the basis of the monitoring result, the ground control device 21 generates device information indicating the state of the on-board devices 10 and the state of the wireless devices 20, and transmits the device information to the course control device 26. The state of the on-board devices 10 and the state of the wireless devices 20 can be monitored by the information acquisition unit 61 of the course control device 26 instead of the ground control device 21. Specifically, the information acquisition unit 61 monitors the state of the on-board devices 10 and the state of the wireless devices 20 by communicating with the on-board devices 10 and the wireless devices 20 via the ground control device 21, and updates the device state information table 77 on the basis of the monitoring result.

On the basis of the schedule information stored in the schedule information storage unit 52 and the train position information and train control information received from the ground control device 21, the course control unit 62 determines whether there is a course control target train 30. Specifically, the course control unit 62 determines, for each train 30, the block in which the train 30 is present on the basis of the current position of the train 30 identified by the train position information received from the ground control device 21. The course control unit 62 also determines the current control state of the train 30 on the basis of the train control information.

On the basis of the block in which the train 30 is present, the route of the train 30 defined by the schedule information, and the current control state of the train 30, the course control unit 62 determines whether each train 30 is a train whose course should be controlled. The following description is based on the assumption that a train 30 whose course should be controlled is the train 30a, and the train 30a is referred to as a control target train 30a as described above. However, when a train 30 whose course should be controlled is any of the trains 30b to 30n, the course control unit 62 performs, on that train 30, processes similar to the processes for the train 30a.

On the basis of the train position information and the schedule information, the course control unit 62 generates course control information for controlling the course of the control target train 30a, and transmits the generated course control information to the interlocking control device 23. Thus, the on-board device 10 of the control target train 30a is notified of the train control information that is based on the course control information via the ground control device 21 and the wireless device 20. The train control unit 12 of the control target train 30a acquires the train control information via the wireless communication unit 11, and performs processing according to the acquired train control information, so that the control target train 30a can proceed to the stop limit position. Specifically, the train control unit 12 can display the acquired train control information on a display unit (not illustrated), and the driver of the control target train 30a can control the operation of the control target train 30a on the basis of the train control information displayed on the display unit. In addition, the train control unit 12 can dynamically control the operation of the control target train 30a on the basis of the acquired train control information.

The course control unit 62 includes a determination unit 63 and a course processing unit 64. The determination unit 63 determines whether a departure restriction condition is satisfied in course control processes for the control target train 30a. If the determination unit 63 determines that a departure restriction condition is satisfied, the course processing unit 64 prevents the control target train 30a from departing from the first station 91 toward the second station 93. Therefore, it is possible to prevent the control target train 30a from stopping and staying between the first station 91 and the second station 93 or at the second station 93. Hereinafter, departure restriction conditions will be described in detail based on the assumption that blocks and routes are set as illustrated in FIGS. 4 to 7.

Figure 11:
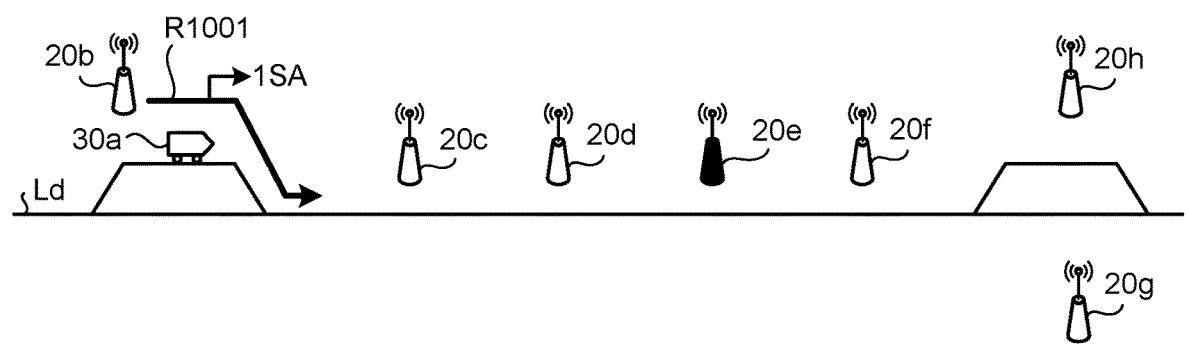
FIG. 11 is a diagram for explaining a departure restriction condition according to the first embodiment.
Figure 12:
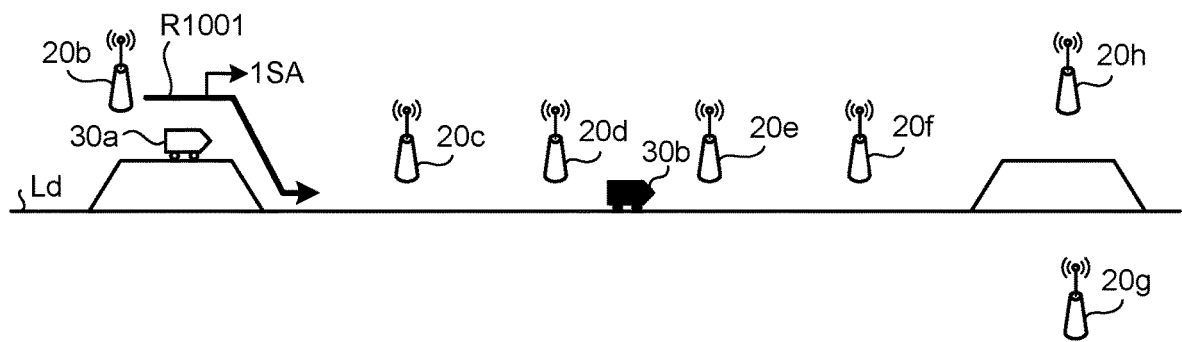
FIG. 12 is a diagram for explaining a departure restriction condition according to the first embodiment.

FIGS. 11 and 12 are diagrams for explaining departure restriction conditions according to the first embodiment. In the example illustrated in FIG. 11, the wireless device 20e of the wireless devices 20c to 20f whose wireless communication range includes the inter-station region 92 has failed. In a case where the wireless device 20e has failed, if the control target train 30a proceeds to the departure course 1SA, the control target train 30a becomes unable to exchange information with the ground control device 21 via the wireless device 20 in the area included in the wireless communication range of the wireless device 20e in the inter-station region 92.

Since the train control unit 12 of the on-board device 10 cannot exchange information with the ground control device 21, the train control unit 12 stops the control target train 30a. Therefore, the control target train 30a stops in the inter-station region 92, and the control target train 30a stays in the inter-station region 92 until the wireless device 20e is recovered from failure. The same applies to a case where a failure occurs in any of the wireless devices 20c to 20f other than the wireless device 20e.

Therefore, the determination unit 63 holds a departure restriction condition: one or more of the wireless devices 20c to 20f whose wireless communication range includes the inter-station region 92 are in a failure state. The determination unit 63 determines whether the departure restriction condition is satisfied on the basis of the device information indicating the state of the wireless devices 20 stored in the device information storage unit 54.

If the determination unit 63 determines that the departure restriction condition is satisfied, that is, if one or more of the wireless devices 20 whose wireless communication range includes the inter-station region 92 are in a failure state, the course processing unit 64 does not output, to the interlocking control device 23, course control information for the departure course of the control target train 30a. Therefore, the control target train 30a is prevented from proceeding to the departure course, and it is possible to prevent the control target train 30a from staying in the inter-station region 92.

In the example illustrated in FIG. 12, a failure has occurred in the on-board device 10 of the preceding train 30b traveling in the inter-station region 92. The failure of the on-board device 10 is a failure of the wireless communication unit 11 or a failure of the train control unit 12. In the case of a failure of the wireless communication unit 11, the train control unit 12 of the on-board device 10 cannot exchange information with the ground control device 21 via the wireless device 20, and thus stops the preceding train 30b. In the case of a failure of the train control unit 12, the operation of the train control unit 12 stops, and thus the preceding train 30b stops. Therefore, in response to a failure of the on-board device 10 of the preceding train 30b, the preceding train 30b is liable to stop in the inter-station region 92 and stay in the inter-station region 92 until the on-board device 10 of the preceding train 30b is recovered.

Therefore, the determination unit 63 holds a departure restriction condition: the on-board device 10 of the preceding train 30b is in a failure state. The determination unit 63 determines whether the departure restriction condition is satisfied on the basis of the device information indicating the state of the on-board devices 10 stored in the device information storage unit 54. If the determination unit 63 determines that the departure restriction condition is satisfied, that is, if the on-board device 10 of the preceding train 30b is in a failure state, the course processing unit 64 does not output, to the interlocking control device 23, course control information for the departure course of the control target train 30a at the first station 91. Therefore, the control target train 30a is prevented from proceeding to the departure course, and it is possible to prevent the control target train 30a from staying in the inter-station region 92 or at the second station 93.

In a case where the on-board device 10 of the preceding train 30b traveling in the inter-station region 92 is not in a failure state, if one or more preceding trains 30b are stationary in the inter-station region 92, the control target train 30a is liable to stay in the inter-station region 92 depending on how long the preceding train 30b remains stationary.

Therefore, another departure restriction condition is set: the preceding train 30b is stationary in the inter-station region 92. If the determination unit 63 determines that one or more preceding trains 30b are stationary in the inter-station region 92 on the basis of the train information stored in the train information storage unit 53, the determination unit 63 determines that the departure restriction condition is satisfied. This also makes it possible to prevent the control target train 30a from staying in the inter-station region 92. Alternatively, the determination unit 63 can determine that the departure restriction condition is satisfied only when one or more preceding trains 30b are stationary at an unexpected position in the inter-station region 92 for any reason except signal information.

In the above determination as to whether the departure restriction condition is satisfied, the determination unit 63 determines that the preceding train 30b is in a stationary state if the current position of the preceding train 30b has not changed on the basis of the train position information indicating the current position of the preceding train 30b. Alternatively, the determination unit 63 can repeat the process of calculating the speed of the preceding train 30b on the basis of the train position information indicating the current position of the preceding train 30b, and determine that the preceding train 30b is in a stationary state if the calculated speed of the preceding train 30b is zero. Still alternatively, in a case where information indicating the speed of the preceding train 30b is included in the train position information, the determination unit 63 can determine that the preceding train 30b is in a stationary state on the basis of the information indicating the speed of the preceding train 30b.

The schedule information also includes train operation information for causing a plurality of trains 30 to simultaneously travel in the inter-station region 92. Therefore, the course control unit 62 sometimes causes a plurality of trains to simultaneously travel in the inter-station region 92 on the basis of the schedule information. While a plurality of trains 30 are simultaneously traveling in the inter-station region 92, if the trains 30 stop without referring to the schedule information, the plurality of trains 30 stay in the inter-station region 92. Further, while the trains 30 are staying in the inter-station region 92, if another train 30 proceeds to a departure course to leave the first station 91, more trains 30 stay in the inter-station region 92. Therefore, the course control unit 62 prevents the control target train 30a from proceeding to a departure course on the basis of a departure restriction condition: the preceding train 30b is stationary in the inter-station region 92. Thus, it is possible to prevent a plurality of trains 30 from staying in the inter-station region 92 or at the second station 93.

In course control processes for the control target train 30a, the determination unit 63 determines whether an entry restriction condition is satisfied in addition to a departure restriction condition. If the determination unit 63 determines that an entry restriction condition is satisfied, the course processing unit 64 prevents the control target train 30a from entering the in-premise course of the second station 93. Therefore, it is possible to prevent the control target train 30a from remaining stationary and staying at the second station 93.

Figure 13:
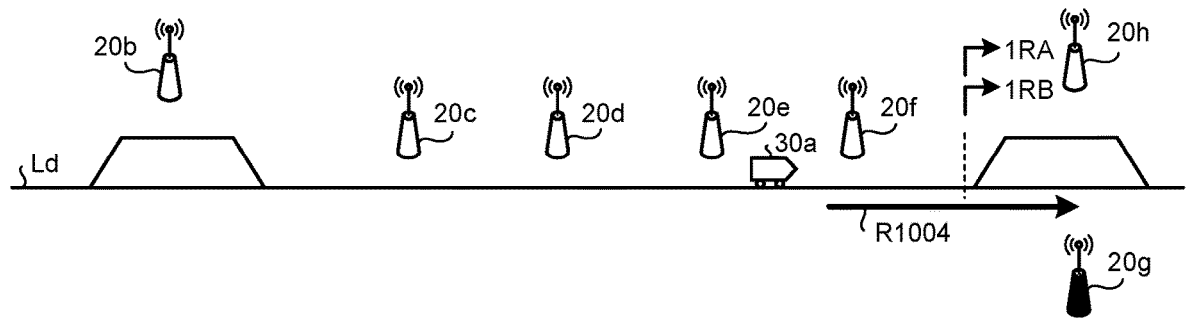
FIG. 13 is a diagram for explaining an entry restriction condition according to the first embodiment.

FIG. 13 is a diagram for explaining an entry restriction condition according to the first embodiment. In the example illustrated in FIG. 13, a failure has occurred in the wireless device 20g whose wireless communication range includes one of the two in-premise courses 1RA and 1RB of the second station 93, that is, the in-premise course 1RB. In a case where the route of the control target train 30a includes the route with route ID R1004, if the control target train 30a enters the in-premise course 1RB, the on-board device 10 of the control target train 30a becomes unable to exchange information with the ground control device 21 via the wireless device 20 in the in-premise course 1RB. Therefore, the control target train 30a is liable to stop on the in-premise course 1RB and stay there without reaching the platform of the second station 93.

Therefore, the determination unit 63 holds an entry restriction condition: the wireless device 20 whose wireless communication range includes one of the in-premise courses 1RA and 1RB of the second station 93 included in the route of the control target train 30a is in a failure state. The determination unit 63 determines whether the entry restriction condition is satisfied on the basis of the device information indicating the state of the wireless devices 20 stored in the device information storage unit 54.

If the determination unit 63 determines that the entry restriction condition is satisfied, that is, if one or more of the wireless devices 20 whose wireless communication range includes an in-premise course of the second station 93 are in a failure state, the course processing unit 64 does not output, to the interlocking control device 23, course control information for the in-premise course. Consequently, the control target train 30a is prevented from entering the in-premise course of the second station 93, and it is possible to prevent the control target train 30a from staying on the in-premise course of the second station 93.

In a case where the on-board device 10 of the preceding train 30b has failed on one of the in-premise courses 1RA and 1RB of the second station 93 included in the route of the control target train 30a or on a departure course, the preceding train 30b is liable to remain stationary at the second station 93 and stay at the second station 93. Therefore, the determination unit 63 holds an entry restriction condition: the on-board device 10 of the preceding train 30b is in a failure state on the in-premise course or departure course of the second station 93 included in the route of the control target train 30a. The determination unit 63 determines whether the entry restriction condition is satisfied on the basis of the device information indicating the state of the on-board devices 10 stored in the device information storage unit 54.

If the determination unit 63 determines that the entry restriction condition is satisfied, that is, if the on-board device 10 of the preceding train 30b is in a failure state on the in-premise course or departure course of the second station 93 included in the route of the control target train 30a, the course processing unit 64 does not output, to the interlocking control device 23, course control information for the in-premise course. Consequently, the control target train 30a is prevented from entering the in-premise course of the second station 93, and it is possible to prevent the control target train 30a from staying on the in-premise course of the second station 93.

Figure 14:
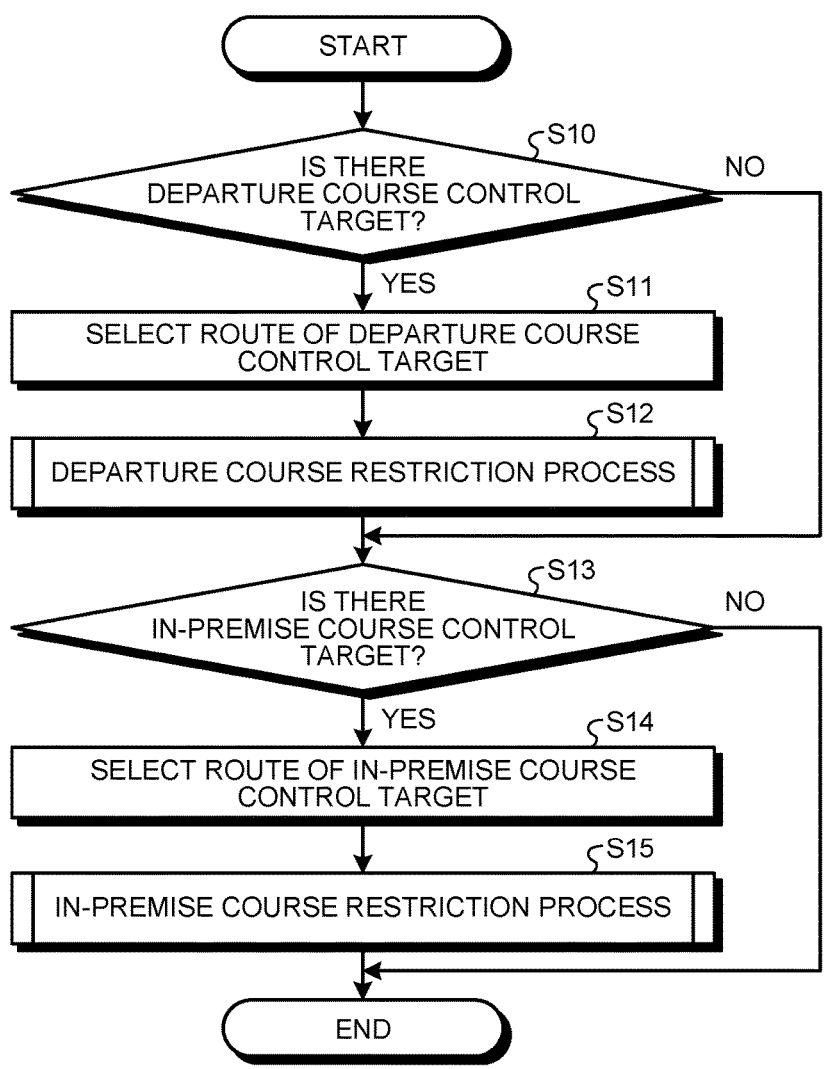
FIG. 14 is a flowchart illustrating an exemplary course control process performed by a course control unit according to the first embodiment.

Next, the operation of the course control unit 62 of the course control device 26 will be described with reference to flowcharts. FIG. 14 is a flowchart illustrating an exemplary course control process performed by the course control unit 62 according to the first embodiment. The following description is based on the premise that the route information table 75 is as illustrated in FIG. 4, the schedule information is as illustrated in FIG. 8, the wireless device information table 76 is as illustrated in FIG. 9, and the device state information table 77 is as illustrated in FIG. 10.

On the basis of the train operation information on each train 30, the course processing unit 64 of the course control unit 62 determines whether there is a departure course control target train 30 (step S10). The departure course control target train 30 is a train 30 that requires a course control process for its departure course. For example, the departure course control target train 30 is a train 30 that is about to leave the first station 91 on time after stopping at the first station 91 or a train 30 that is about to pass through the first station 91 on time. In the following description, the departure course control target train 30 is the train 30a. The train 30a is referred to as a departure control target train 30a, and the train 30b preceding the train 30a is referred to as a preceding train 30b.

In response to confirming the presence of the departure control target train 30a (step S10: Yes), the course processing unit 64 selects the route of the departure control target train 30a on the basis of the current position information and travel route information on the departure control target train 30a (step S11). In a case where the departure control target train 30a is the train 30 with train ID "T1001" and the current position of the departure control target train 30a is the block with block ID "B999", the route of the departure control target train 30a is the route including route ID "R1001".

After the course processing unit 64 selects the route of the departure control target train 30a, the determination unit 63 and the course processing unit 64 of the course control unit 62 execute a departure restriction process (step S12). Step S12 corresponds to steps S20 to S29 illustrated in FIG. 15 and will be described in detail later.

In response to determining that there is no departure course control target train 30 in step S10 (step S10: No), or after step S12 is completed, the course processing unit 64 of the course control unit 62 determines whether there is an in-premise course control target train 30 (step S13). The in-premise course control target train 30 is a train 30 that requires a course control process for its in-premise course. For example, the in-premise course control target train 30 is a train 30 that is about to enter the second station 93 on time or a train 30 that is about to pass through the second station 93 on time. In the following description, the in-premise course control target train 30 is the train 30c illustrated in FIG. 2, and the train 30c is referred to as an in-premise control target train 30c.

In response to the confirming the presence of the in-premise control target train 30c (step S13: Yes), the course processing unit 64 selects the route of the in-premise control target train 30c on the basis of the current position information and travel route information on the in-premise control target train 30c (step S14). In a case where the in-premise control target train 30c is the train 30 with train ID "T1002" and the current position of the in-premise control target train 30c is the block with block ID "B1008", the route of the in-premise control target train 30c is the route including route ID "R1005".

After the course processing unit 64 selects the route of the in-premise control target train 30c, the determination unit 63 and the course processing unit 64 of the course control unit 62 execute an in-premise course restriction process (step S15). Step S15 corresponds to steps S60 to S70 illustrated in FIG. 17 and will be described in detail later.

Figure 15:
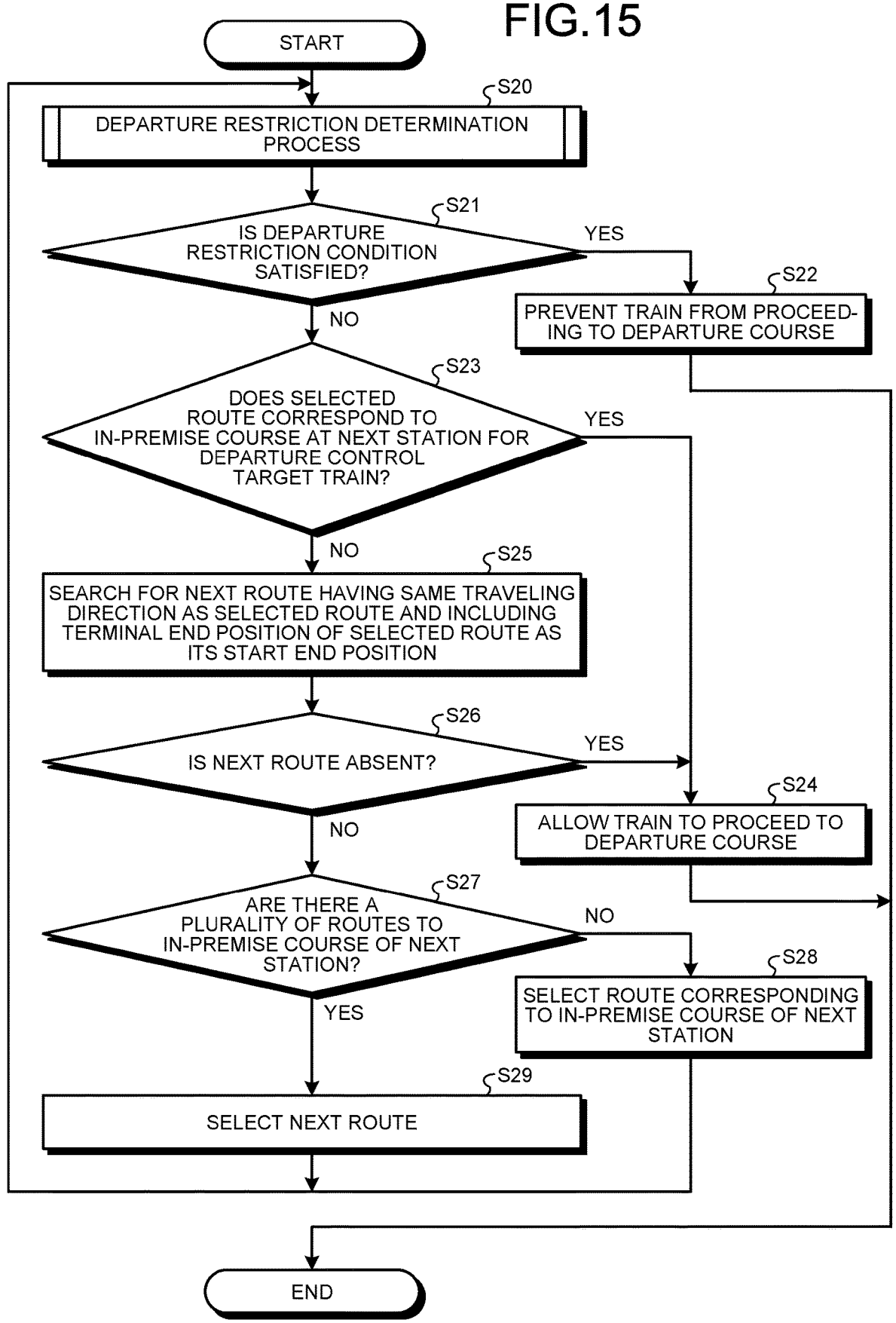
FIG. 15 is a flowchart illustrating an exemplary departure course restriction process according to the first embodiment.

FIG. 15 is a flowchart illustrating an exemplary departure course restriction process in step S12. The determination unit 63 of the course control unit 62 executes a departure restriction determination process for determining whether a departure restriction condition is satisfied (step S20). Step S20 corresponds to steps S40 to S48 illustrated in FIG. 16 and will be described in detail later.

Upon completion of step S20, the course processing unit 64 of the course control unit 62 determines whether the determination unit 63 has determined that a departure restriction condition is satisfied (step S21). In response to the determination unit 63 determining that a departure restriction condition is satisfied (step S21: Yes), the course processing unit 64 does not output, to the interlocking control device 23, course control information for the departure course of the control target train 30a, thereby preventing the departure control target train 30a from proceeding to the departure course (step S22).

In response to determining that a departure restriction condition is not satisfied (step S21: No), the determination unit 63 determines whether the selected route corresponds to an in-premise course at the next station for the departure control target train 30a (step S23). In a case where the departure control target train 30a is the train 30 with train ID "T1001" and the selected route is the route with route ID "R1001", the selected route does not correspond to an in-premise course at the next station for the departure control target train 30a. On the other hand, in a case where the departure control target train 30a is the train 30 with train ID "T1001" and the selected route is the route with route ID "R1004", the selected route corresponds to an in-premise course at the next station for the departure control target train 30a.

In response to the determination unit 63 determining that the selected route corresponds to an in-premise course at the next station for the departure control target train 30a (step S23: Yes), the course processing unit 64 outputs course control information indicating a proceed sign for the departure course to allow the departure control target train 30a to proceed to the departure course (step S24).

In response to determining that the selected route does not correspond to an in-premise course at the next station for the departure control target train 30a (step S23: No), the determination unit 63 searches for the next route having the same traveling direction as the selected route and including the terminal end position of the selected route as its start end position (step S25). In a case where the departure control target train 30a is the train 30 with train ID "T1001" and the selected route is the route with route ID "R1001", the terminal end position of the selected route is position P1005 illustrated in FIG. 5, and the route including position P1005 as its start end position is the route with route ID "R1005".

The determination unit 63 determines whether there is no next route to be searched for in step S25 (step S26). In response to the determination unit 63 determining that there is no next route, or the next route is absent (step S26: Yes), the course processing unit 64 allows the departure control target train 30a to proceed to the departure course in step S24 described above, and causes the departure control target train 30a to travel on the departure course. In response to determining that there is a next route, or the next route is not absent (step S26: No), the determination unit 63 determines whether there are a plurality of routes to an in-premise course of the next station (step S27).

In response to determining that there are a plurality of routes to an in-premise course of the next station (step S27: Yes), the determination unit 63 selects the next route that does not include the in-premise course of the next station (step S29), and executes step S20 and the subsequent steps on the next route that does not include the in-premise course of the next station. In response to determining that there is not a plurality of routes to an in-premise course of the next station (step S27: No), the determination unit 63 selects the next route including the in-premise course of the next station (step S28), and executes step S20 and the subsequent steps on the next route including the in-premise course of the next station.

Upon completion of step S22 or step S24, the course control unit 62 ends the process illustrated in FIG. 15 and proceeds to step S13 illustrated in FIG. 14.

Figure 16:
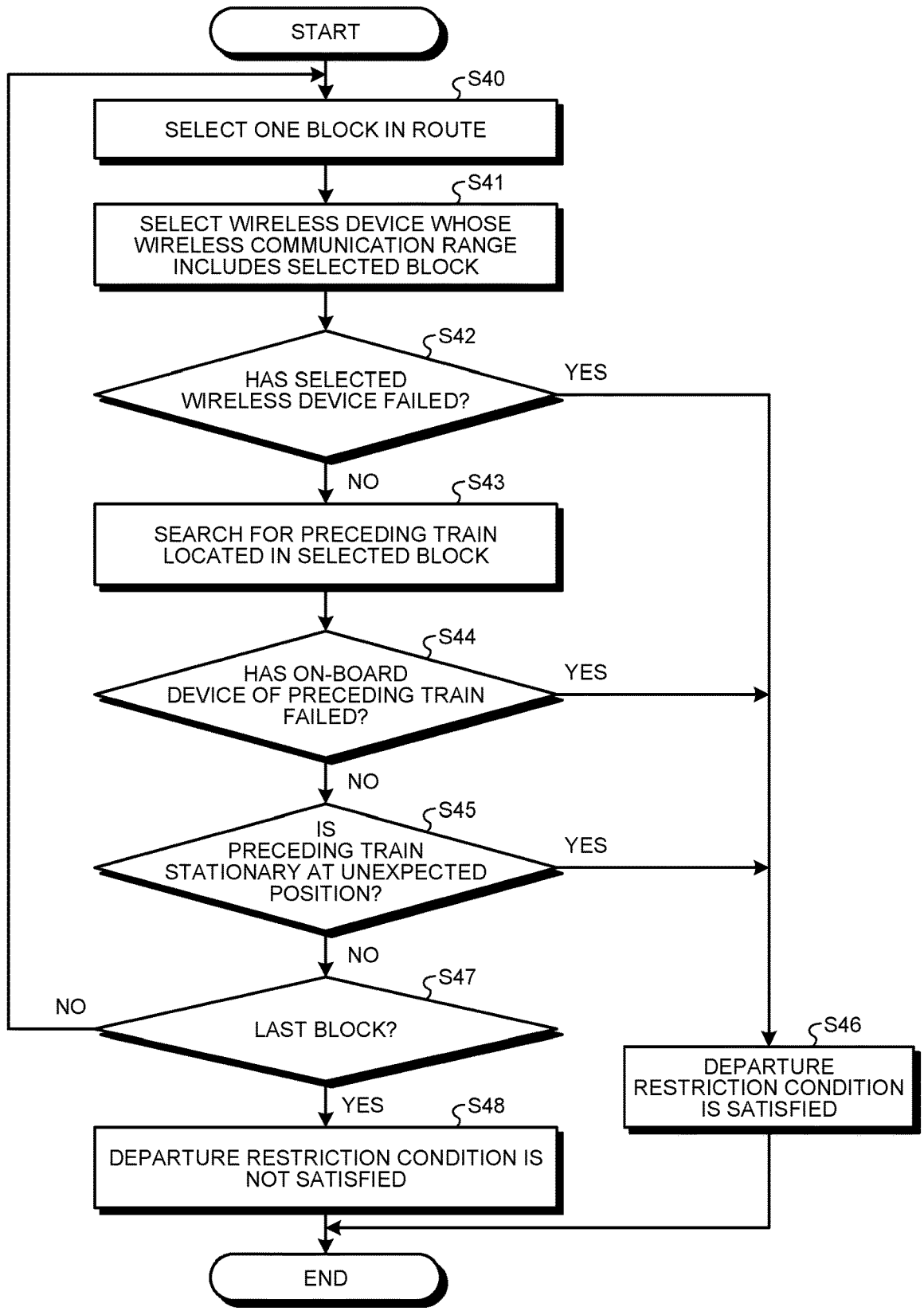
FIG. 16 is a flowchart illustrating an exemplary departure restriction determination process according to the first embodiment.

FIG. 16 is a flowchart illustrating an exemplary departure restriction determination process in step S20 illustrated in FIG. 15. The determination unit 63 selects one block in the selected route (step S40). On the basis of the wireless device information table 76 stored in the device information storage unit 54, the determination unit 63 selects the wireless device 20 whose wireless communication range includes the selected block (step S41). In a case where the block ID of the selected block is B1005, the wireless device 20 whose wireless communication range includes the selected block is the wireless device 20c with device ID W2003 illustrated in FIG. 2.

Next, on the basis of the device information on each wireless device 20 included in the device state information table 77 stored in the device information storage unit 54, the determination unit 63 determines whether the wireless device 20 selected in step S41 has failed (step S42). In response to determining that the wireless device 20 selected in step S41 has failed (step S42: Yes), the determination unit 63 determines that a departure restriction condition is satisfied (step S46), and proceeds to step S21 illustrated in FIG. 15.

In response to determining that the wireless device 20 selected in step S41 is not in a failure state (step S42: No), the determination unit 63 searches for the preceding train 30b located in the selected block (step S43). In step S43, the determination unit 63 determines the block in which the preceding train 30b is located on the basis of the train information stored in the train information storage unit 53. If the block in which the preceding train 30b is located is the selected block, the determination unit 63 confirms the presence of the preceding train 30b located in the selected block.

Next, the determination unit 63 determines whether the on-board device 10 of the preceding train 30b located in the selected block has failed (step S44). In response to determining that the on-board device 10 of the preceding train 30b located in the selected block has failed (step S44: Yes), the determination unit 63 determines that a departure restriction condition is satisfied (step S46), and proceeds to step S21 illustrated in FIG. 15.

In response to determining that the on-board device 10 of the preceding train 30b is not in a failure state (step S44: No), the determination unit 63 determines whether the preceding train 30b located in the selected block is stationary at an unexpected position for any reason except signal information indicating a stop sign (step S45). In response to determining that the preceding train 30b is stationary at an unexpected position on the basis of the train information stored in the train information storage unit 53 (step S45: Yes), the determination unit 63 determines that a departure restriction condition is satisfied (step S46), and proceeds to step S21 illustrated in FIG. 15.

In response to determining that the preceding train 30b is not stationary at an unexpected position (step S45: No), the determination unit 63 determines whether the selected block is the last block (step S47). In response to determining that the selected block is not the last block (step S47: No), the determination unit 63 proceeds to step S40 and executes a process for the next block.

In response to determining that the selected block is the last block (step S47: Yes), the determination unit 63 determines that no departure restriction condition is satisfied (step S48), and proceeds to step S21 illustrated in FIG. 15.

Figure 17:
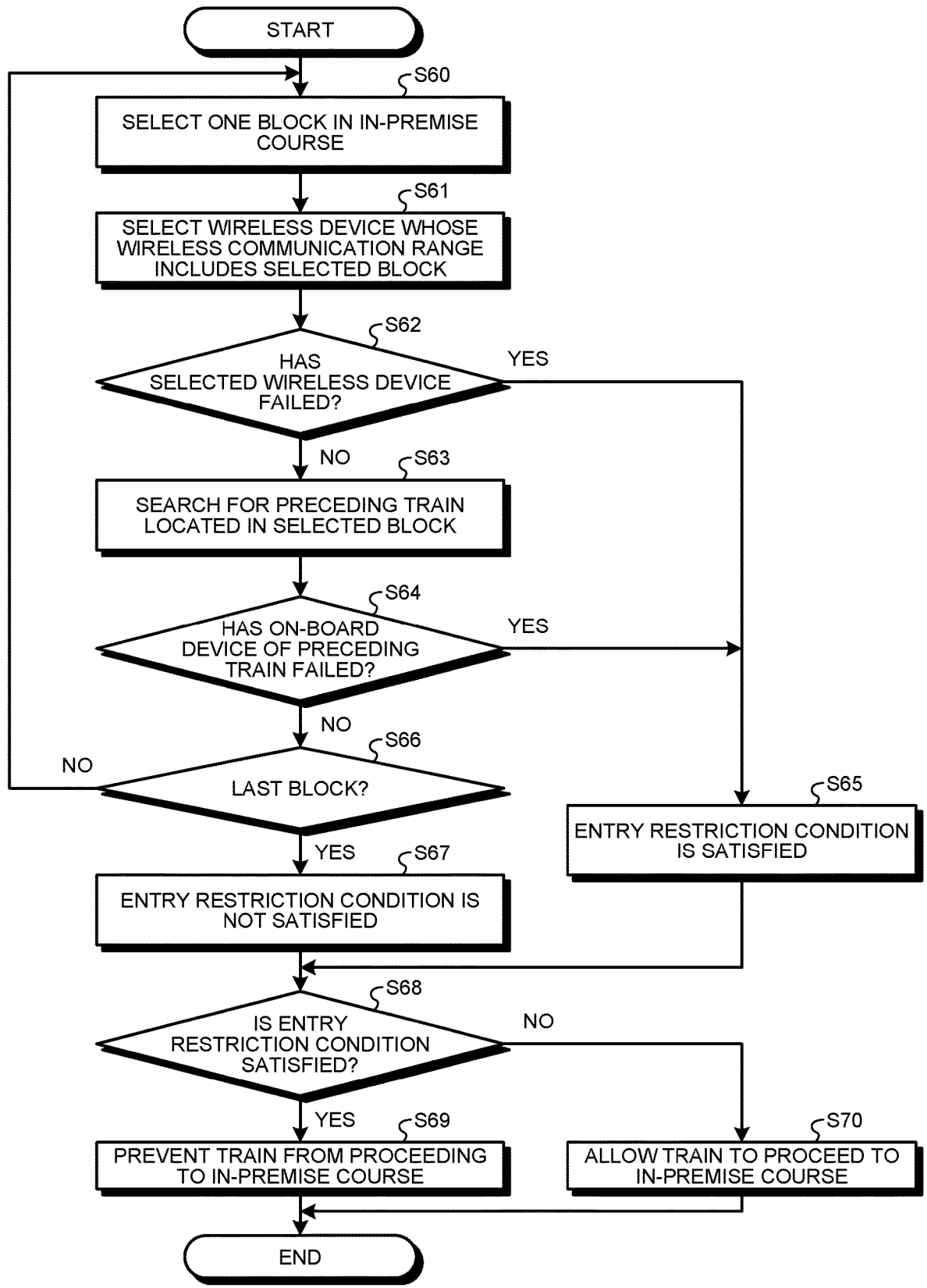
FIG. 17 is a flowchart illustrating an exemplary in-premise course restriction process according to the first embodiment.

FIG. 17 is a flowchart illustrating an exemplary in-premise course restriction process in step S15. The determination unit 63 selects one block in the in-premise course (step S60), and executes step S61 and the subsequent steps. Steps S61 to S64 and S66 are similar to steps S41 to S44 and S47 illustrated in FIG. 16, and descriptions thereof will be omitted.

In response to determining in step S62 that the selected wireless device 20 has failed (step S62: Yes), the determination unit 63 determines that an entry restriction condition is satisfied (step S65). In response to determining in step S66 that the selected block is the last block (step S66: Yes), the determination unit 63 determines that no entry restriction condition is satisfied (step S67).

Next, the course processing unit 64 determines in step S68 whether the determination unit 63 has determined that an entry restriction condition is satisfied (step S68). In response to the determination unit 63 determining that an entry restriction condition is satisfied (step S68: Yes), the course processing unit 64 does not output, to the interlocking control device 23, course control information for the in-premise course of the in-premise control target train 30c, thereby preventing the in-premise control target train 30c from proceeding to the in-premise course (step S69).

In response to the determination unit 63 determining that no entry restriction condition is satisfied (step S68: No), the course processing unit 64 outputs, to the interlocking control device 23, course control information including information indicating a proceed sign as information for the in-premise course of the in-premise control target train 30c, thereby allowing the in-premise control target train 30c to proceed to the in-premise course (step S70).

Figure 18:
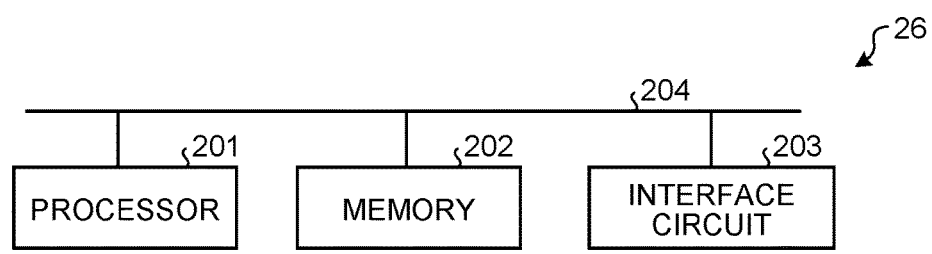
FIG. 18 is a diagram illustrating an exemplary hardware configuration of the course control device according to the first embodiment.

FIG. 18 is a diagram illustrating an exemplary hardware configuration of the course control device 26 according to the first embodiment. As illustrated in FIG. 18, the course control device 26 includes a processor 201, a memory 202, and an interface circuit 203. The processor 201, the memory 202, and the interface circuit 203 can exchange data with one another via a bus 204. In the course control device 26, the route information storage unit 51, the schedule information storage unit 52, the train information storage unit 53, and the device information storage unit 54 are realized by the memory 202. The communication unit 41 is realized by the interface circuit 203.

The processor 201 executes the functions of the information acquisition unit 61 and the course control unit 62 by reading and executing a course control program stored in the memory 202. The processor 201 is an example of a processing circuit, and includes one or more of a central processing unit (CPU), a digital signal processor (DSP), and a system large scale integration (LSI). The memory 202 includes one or more of a non-volatile or volatile semiconductor memory such as a random access memory (RAM), a read only memory (ROM), a flash memory, and an erasable program read only memory (EPROM), a magnetic disk, a flexible memory, an optical disk, a compact disc, and a digital versatile disc (DVD).

As described above, the wireless train control system 1 according to the first embodiment includes the on-board device 10 mounted in each train 30, the plurality of wireless devices 20 arranged along the track 90 from the first station 91 to the second station 93, the ground control device 21, and the course control device 26, and controls the courses of the plurality of trains 30 traveling on a track of a line including a plurality of stations. The ground control device 21 exchanges information with the on-board devices 10 via the plurality of wireless devices 20. The course control device 26 acquires the position information on the train 30 via two or more devices including the wireless devices 20 and the ground control device 21, and on the basis of the position information on the train 30, transmits information for controlling the course of the train 30 to the on-board device 10 via two or more devices including the ground control device 21 and the wireless devices 20. The course control device 26 includes: the information acquisition unit 61 that acquires the position information on each train 30 via any of the plurality of wireless devices 20; and the course control unit 62 that controls the course of each train 30 on the basis of the position information on each train 30 acquired by the information acquisition unit 61. The course control unit 62 prevents the course control target train 30 from proceeding to at least one of the departure course and the in-premise course in at least one of a case where at least one of the plurality of wireless devices 20 is in a failure state, a case where the on-board device 10 that is mounted in a preceding train preceding the course control target train 30a on the track 90 and controls the preceding train on the basis of the train control information acquired via the wireless devices 20 is in a failure state, and a case where the preceding train is in a stationary state between the first station 91 and the second station 93. Therefore, it is possible to prevent the train 30 from at least one of staying between stations and staying in the premises of a station.

The information acquisition unit 61 acquires device information indicating the state of the wireless devices 20. The determination unit 63 determines, on the basis of the device information acquired by the information acquisition unit 61, whether one or more wireless devices 20 arranged between the first station 91 and the second station 93 or at the second station 93 among the plurality of wireless devices 20 are in a failure state. The course processing unit 64 prevents the course control target train 30 from departing from the first station 91 toward the second station 93 in response to the determination unit 63 determining that the one or more wireless devices 20 are in a failure state. Therefore, it is possible to keep the course control target train 30 at the platform of the first station 91 while preventing the course control target train 30 from staying in the inter-station region 92, or to avoid a situation in which the course control target train 30 stops on an in-premise course of the second station 93 and blocks another in-premise course.

The information acquisition unit 61 acquires device information indicating the state of the on-board device 10 of the preceding train described above. The determination unit 63 determines whether the on-board device 10 of the preceding train is in a failure state on the basis of the device information acquired by the information acquisition unit 61. The course processing unit 64 prevents the course control target train 30 from proceeding to a departure course at the first station 91 toward the second station 93 in response to the determination unit 63 determining that the on-board device 10 of the preceding train is in a failure state. Therefore, it is possible to keep the course control target train 30 at the platform of the first station 91 while preventing the control target train 30a from staying in the inter-station region 92, or to avoid a situation in which the course control target train 30 stops on an in-premise course of the second station 93 and blocks another in-premise course.

The information acquisition unit 61 acquires position information indicating the current position of the preceding train. The determination unit 63 determines, on the basis of the position information acquired by the information acquisition unit 61, whether the preceding train is in a stationary state between the first station 91 and the second station 93. The course processing unit 64 prevents the course control target train 30a from proceeding to a departure course at the first station 91 toward the second station 93 in response to the determination unit 63 determining that the preceding train is in a stationary state between the first station 91 and the second station 93. Therefore, it is possible to keep the course control target train 30 at the platform of the first station 91 while preventing the course control target train 30 from staying in the inter-station region 92. Note that the speed of the preceding train may be calculated by the on-board device 10 of the preceding train or the ground control device 21. The information acquisition unit 61 can acquire, as position information, information indicating the speed of the preceding train from the on-board device 10 of the preceding train or the ground control device 21, and store the position information in the train information storage unit 53.

Further, the determination unit 63 determines whether one or more wireless devices 20 whose wireless communication range includes an in-premise course of the second station 93 included in the route of the course control target train 30 among the plurality of wireless devices 20 are in a failure state. The course processing unit 64 prevents the course control target train 30 from entering the second station 93 in response to the determination unit 63 determining that one or more wireless devices 20 whose wireless communication range includes an in-premise course of the second station 93 are in a failure state. Therefore, it is possible to avoid a situation in which the course control target train 30 stops on an in-premise course of the second station 93 and blocks another in-premise course. Even though some passengers tend to feel uneasy when the train stops on an in-premise course of the second station 93, it is possible to prevent such passengers from feeling uneasy.

Second Embodiment

In the first embodiment, when a departure restriction condition is satisfied in a course control process, a course restriction is imposed on the departure course. In a second embodiment, in a case where a departure restriction condition is satisfied, if a different in-premise course is available, the train is allowed to enter the second station 93 through the different in-premise course. Note that the course control device 26 in the second embodiment has the same configuration and performs the same processes as the course control device 26 in the first embodiment, except that the processes of the course control unit 62 are partially different. Therefore, processes different from the processes in the first embodiment will mainly be described using the same reference signs. The following description is based on the premise that the route information table 75 is as illustrated in FIG. 4, the schedule information is as illustrated in FIG. 8, the wireless device information table 76 is as illustrated in FIG. 9, and the device state information table 77 is as illustrated in FIG. 10.

Figure 19:
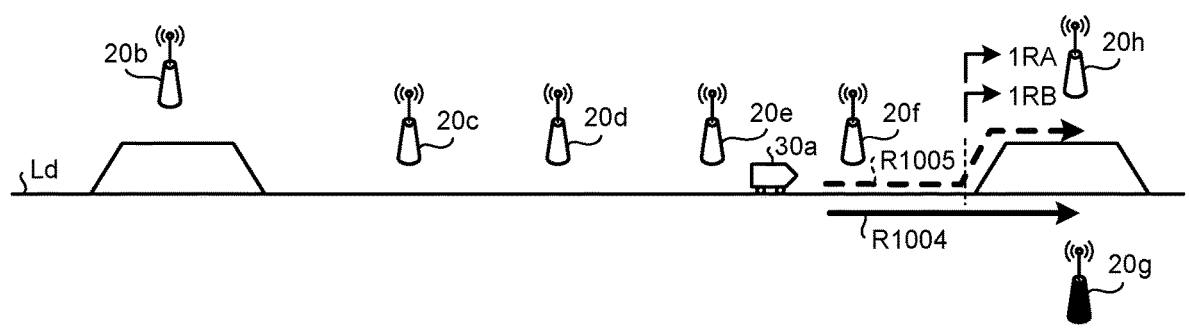
FIG. 19 is a diagram for explaining a course control process performed by a course control device according to a second embodiment.

FIG. 19 is a diagram for explaining a course control process performed by the course control device 26 according to the second embodiment. In the example illustrated in FIG. 19, which is similar to the example illustrated in FIG. 13, a failure has occurred in the wireless device 20g whose wireless communication range includes one of the two in-premise courses of the second station 93, that is, the in-premise course 1RB. In a case where the route of the control target train 30a includes the route with route ID "R1004", if the control target train 30a is allowed to proceed to the in-premise course 1RB, the control target train 30a is liable to stop on the in-premise course 1RB and stay on the in-premise course 1RB without reaching the platform of the second station 93.

However, even in a case where a wireless device 20 whose wireless communication range includes an in-premise course included in the route of the control target train 30a has failed, a different in-premise course included in the wireless communication range of a wireless device 20 that is not in a failure state might be available. In the example illustrated in FIG. 19, the wireless device 20g whose wireless communication range includes the in-premise course 1RB has failed, but the wireless device 20h whose wireless communication range includes the in-premise course 1RA is not in a failure state. Therefore, by changing the route of the control target train 30a from the route with route ID "R1004" to the route with route ID "R1005", it is possible to avoid a situation in which the control target train 30a stays on the in-premise course 1RB of the second station 93.

Therefore, in a case where an in-premise course included in the wireless communication range of the wireless device 20 in a failure state is included in the route of the control target train 30a, if the control target train 30a can enter a different in-premise course, the course control unit 62 according to the second embodiment changes the in-premise course of the control target train 30a and allows the control target train 30a to enter the second station 93. This makes it possible to prevent the control target train 30a from staying before the in-premise course of the second station 93.

Figure 20:
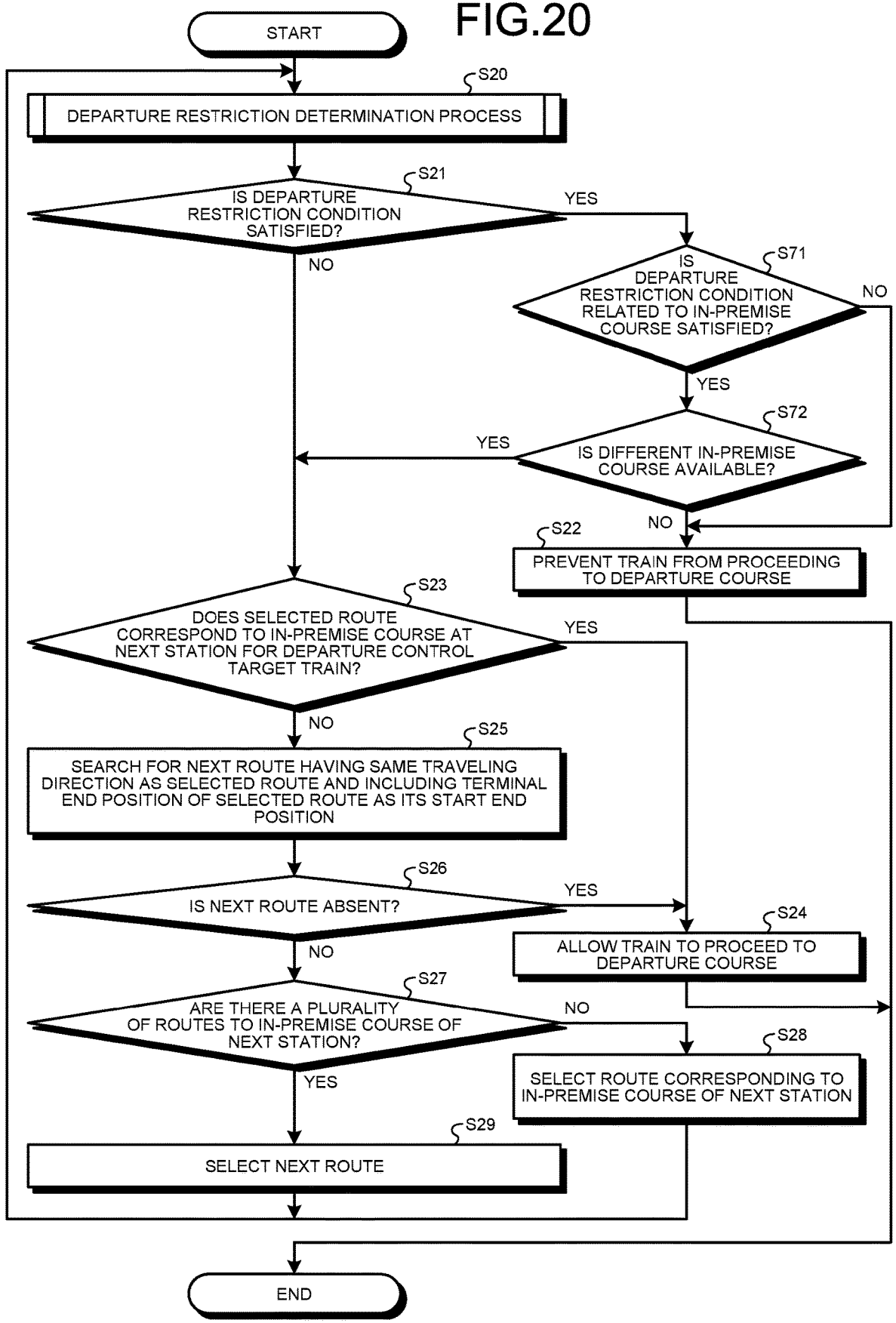
FIG. 20 is a flowchart illustrating an exemplary departure course restriction process according to the second embodiment.

FIG. 20 is a flowchart illustrating an exemplary departure course restriction process, which is different from the departure course restriction process illustrated in FIG. 15 in that steps S71 and S72 are added. Since steps S20 to S29 illustrated in FIG. 20 are the same as steps S20 to S29 illustrated in FIG. 15, descriptions thereof will be omitted.

In response to the determination unit 63 determining that a departure restriction condition is satisfied (step S21: Yes), the course processing unit 64 determines whether the satisfaction of the departure restriction condition determined in step S21 is related to an in-premise course of the next station (step S71). In response to the determination unit 63 determining in step S42 illustrated in FIG. 16 that a wireless device 20 whose wireless communication range includes a block included in an in-premise course of the next station has failed (step S42: Yes), the course processing unit 64 and the determination unit 63 determine that a departure restriction condition related to the in-premise course is satisfied. Alternatively, in response to the determination unit 63 determining in step S44 illustrated in FIG. 16 that the on-board device 10 of the preceding train 30b located in a block included in an in-premise course of the next station has failed (step S44: Yes), the course processing unit 64 determines that a departure restriction condition related to the in-premise course is satisfied.

In response to the determination unit 63 determining that the satisfaction of the departure restriction condition determined in step S21 is related to an in-premise course (Yes in step S71), the course processing unit 64 determines whether a different in-premise course is available at the next station (step S72). In step S72, if one or more in-premise courses that are not included in the course of the departure control target train 30a do not satisfy departure restriction conditions, and if no train 30 is located on the one or more in-premise courses, the course processing unit 64 determines that a different in-premise course is available at the next station.

In response to the determination unit 63 determining that the satisfaction of the departure restriction condition determined in step S21 is not related to an in-premise course (step S71: No), or in response to determining in step S72 that a different in-premise course is not available at the next station (step S72: No), the course processing unit 64 prevents the departure control target train 30a from proceeding to the departure course (step S22). In response to determining that a different in-premise course is available at the next station (step S72: Yes), the course processing unit 64 proceeds to step S23. Since the selected route corresponds to the in-premise course at the next station (step S23: Yes), the course processing unit 64 allows the departure control target train 30a to proceed to the departure course (step S24). Note that the course processing unit 64 can directly proceed to step S24 in response to determining that a different in-premise course is available at the next station (step S72: Yes).

As described above, in a case where one or more wireless devices 20 whose wireless communication range includes one of two or more in-premise courses are in a failure state, if an in-premise course included in the wireless communication range of the remaining wireless devices 20 is available, the course processing unit 64 of the course control device 26 according to the second embodiment changes the in-premise course of the second station 93 to which the course control target train 30 proceeds, and allows the course control target train 30 to enter the second station 93. Therefore, it is possible to continue the operation of the control target train 30a while preventing the control target train 30a from staying in the inter-station region 92. It is also possible to avoid a situation in which the course control target train 30 stops on an in-premise course of the second station 93 and blocks another in-premise course. Even though some passengers tend to feel uneasy when the train stops on an in-premise course of the second station 93, it is possible to prevent such passengers from feeling uneasy.

Third Embodiment

In addition to the operation of the course control device 26 according to the first and second embodiments, the course control device 26 according to a third embodiment performs a course restriction cancellation process to finish preventing the control target train 30a from proceeding to the course. In the third embodiment, the course processing unit 64 of the course control device 26 performs some additional processes. Processes different from the processes in the first and second embodiments will mainly be described using the same reference signs as in the first and second embodiments.

Figure 21:
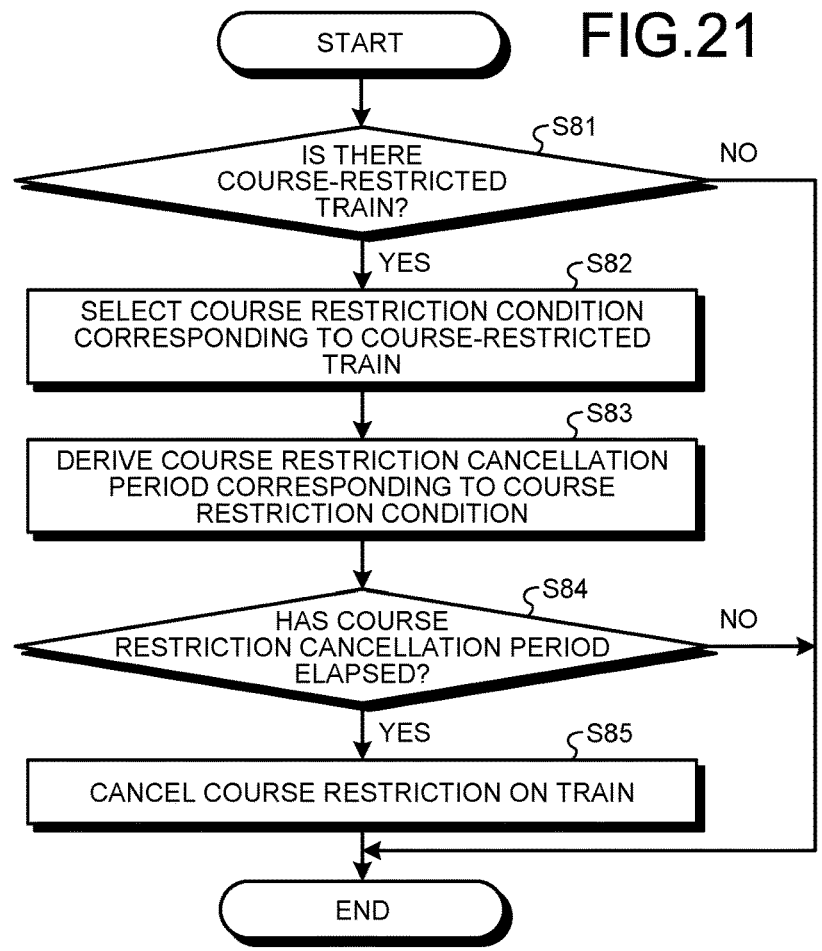
FIG. 21 is a flowchart illustrating an exemplary course restriction cancellation process according to a third embodiment.

FIG. 21 is a flowchart illustrating an exemplary course restriction cancellation process by the course processing unit 64 of the course control device 26 according to the third embodiment. The process illustrated in FIG. 21 is repeatedly executed at regular intervals. The course processing unit 64 determines whether there is a course-restricted train 30, that is, whether there is a train 30 that is prevented from proceeding to a departure course or in-premise course on the basis of course restriction conditions (step S81).

In response to determining that there is a course-restricted train 30 (step S81: Yes), the course processing unit 64 selects the course restriction condition corresponding to the course-restricted train 30 (step S82). Specifically, the course processing unit 64 selects the type of course restriction condition that has caused the course restriction on the course-restricted train 30. Types of course restriction conditions include first to third course restriction conditions. The first course restriction condition is a failure of a wireless device 20 as described above. The second course restriction condition is a failure of the on-board device 10 of the preceding train 30b. The third course restriction condition is the stationary preceding train 30b in the inter-station region 92.

The course processing unit 64 derives a course restriction cancellation period corresponding to the selected type of course restriction condition (step S83). In step S83, the course processing unit 64 reads the basic cancellation period corresponding to the type of course restriction condition from the storage unit 42. The course processing unit 64 further calculates an adjustment period that is based on the cause of the course restriction, subtracts the adjustment period from the basic cancellation period, and derives a course restriction cancellation period.

The basic cancellation period for the first course restriction condition is a period required from a failure of the wireless device 20 to recovery therefrom, and different periods are set in advance in association with failure types and model types of the wireless devices 20. For example, in the case of a failure from which the wireless device 20 is recovered by being rebooted, the basic cancellation period is the time required from the failure of the wireless device 20 to the rebooting. In the case of a failure that requires part replacement, the basic cancellation period is the time from the failure of the wireless device 20 to the completion of the part replacement.

The basic cancellation period for the second course restriction condition is a period required from a failure of the on-board device 10 to recovery therefrom, and different periods are set in advance in association with failure types and model types as in the case of the wireless devices 20. For example, in the case of a failure from which the on-board device 10 is recovered by being rebooted, the basic cancellation period is the time required from the failure of the on-board device 10 to the rebooting. In the case of a failure that requires part replacement, the basic cancellation period is the time from the failure of the on-board device 10 to the completion of the part replacement.

The basic cancellation period for the third course restriction condition is a period required for the preceding train 30b to start traveling after making a stop, and different periods are set in advance in association with causes or types of stops. For example, different periods are set in advance depending on whether the preceding train 30b stops due to sudden braking or whether the preceding train 30b collides with an obstacle.

The adjustment period is calculated by the course processing unit 64 on the basis of the distance to the position of the cause of the satisfaction of a course restriction condition. For example, in the case of the first course restriction condition, the course processing unit 64 makes the adjustment period shorter than the time required for the train 30 to travel from the current position of the course-restricted train 30 to the wireless communication range of the wireless device 20 in a failure state. Similarly, in the case of the second course restriction condition and the third course restriction condition, the course processing unit 64 makes the adjustment period shorter than the time required for the train 30 to travel from the current position of the course-restricted train 30 to a position before the preceding train 30b. Note that the adjustment period only needs to be set such that the course restriction on the course-restricted train 30 is cancelled to enable the train 30 to start traveling again before the on-board device 10 or the wireless device 20 is recovered from failure or by the time that the preceding train 30b starts traveling again. The course processing unit 64 can determine the adjustment period in consideration of the distance to the preceding train 30b.

The course processing unit 64 determines whether the course restriction cancellation period has elapsed since the initiation of the course restriction (step S84). In response to determining that the course restriction cancellation period has elapsed (step S84: Yes), the course processing unit 64 outputs, to the interlocking control device 23, course control information including information indicating a proceed sign as information for causing the course restriction target train to proceed to the restricted course, thereby canceling the course restriction and causing the train 30 to start entering the course (step S85). In response to determining that there is no course-restricted train 30 (step S81: No) or in response to determining that the course restriction cancellation period has not elapsed since the initiation of the course restriction (step S84: No), the course processing unit 64 ends the process illustrated in FIG. 21.

As described above, the course processing unit 64 of the course control device 26 according to the third embodiment sets, on the basis of the type of course restriction condition determined by the determination unit 63, a course restriction cancellation period to finish preventing the train 30 from at least one of departing from the first station 91 toward the second station 93 and entering the second station 93. Therefore, the train 30 can depart from the first station 91 or enter the second station 93 before the on-board device 10 or the wireless device 20 is recovered from the failure, and the operation of the train 30 can be promptly started. It is to be noted that the course processing unit 64 can cancel the course restriction at the timing when the course restriction condition satisfied in the course control process for the course-restricted train 30 is cancelled, and cause the train 30 to start entering the course.

Fourth Embodiment

In the wireless train control system 1 according to the first to third embodiments, the course control device 26 performs course restriction processes. In the wireless train control system 1 according to the fourth embodiment, however, the on-board device 10 performs course restriction processes. That is, the on-board device 10 performs course restriction processes for the train 30 to which the on-board device 10 belongs. In the fourth embodiment, the train control unit 12 of the on-board device 10 executes some or all of the functions of the course processing unit 64 of the course control device 26. The following description is based on the assumption that the on-board device 10 according to the fourth embodiment is mounted in the train 30a illustrated in FIG. 1.

Figure 22:
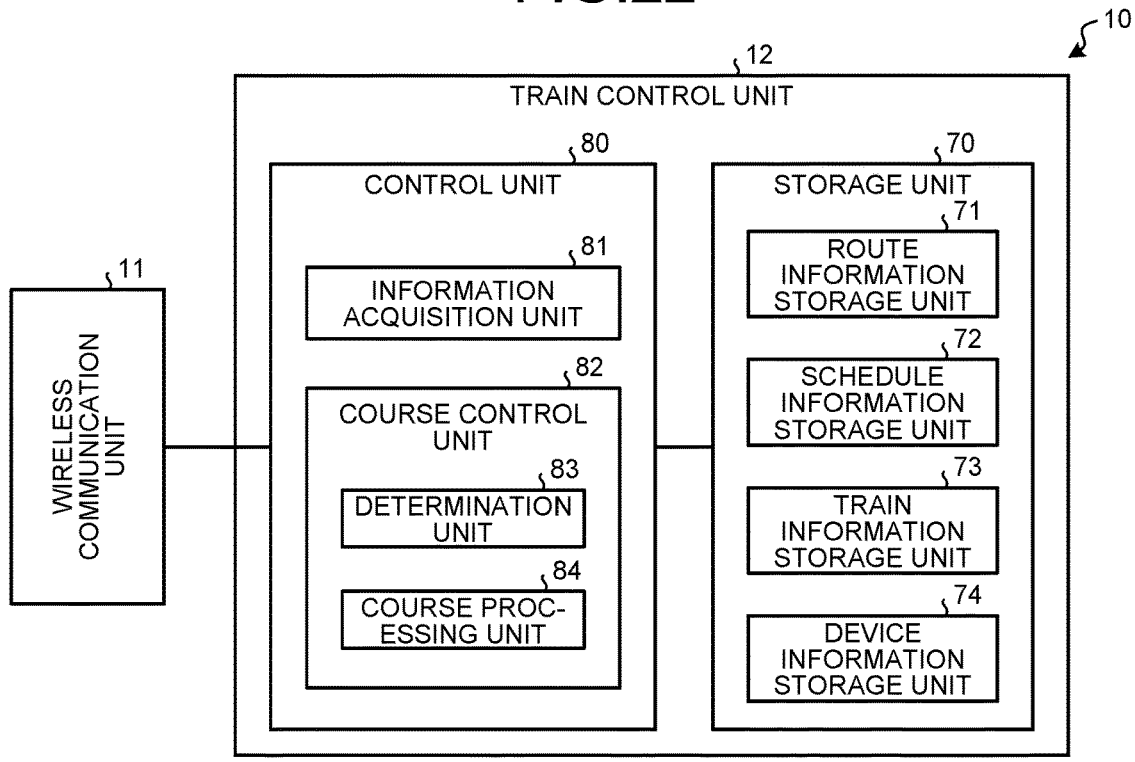
FIG. 22 is a diagram illustrating an exemplary configuration of an on-board device according to a fourth embodiment.

FIG. 22 is a diagram illustrating an exemplary configuration of the on-board device 10 according to the fourth embodiment. As illustrated in FIG. 22, the train control unit 12 of the on-board device 10 includes a storage unit 70 and a control unit 80. The storage unit 70 includes a route information storage unit 71, a schedule information storage unit 72, a train information storage unit 73, and a device information storage unit 74.

The route information storage unit 71, the schedule information storage unit 72, the train information storage unit 73, and the device information storage unit 74 illustrated in FIG. 22 store the same type of information as the route information storage unit 51, the schedule information storage unit 52, the train information storage unit 53, and the device information storage unit 54 illustrated in FIG. 3. Note that the schedule information storage unit 72 may store only the train operation information on the train 30a and the train operation information on the train 30 preceding the train 30a.

The control unit 80 includes an information acquisition unit 81 and a course control unit 82, and the course control unit 82 includes a determination unit 83 and a course processing unit 84. The functions of the information acquisition unit 81 and the course control unit 82 illustrated in FIG. 22 are similar to those of the information acquisition unit 61 and the course control unit 62 illustrated in FIG. 3, but different from those of the information acquisition unit 61 and the course control unit 62 in that information acquisition unit 81 and the course control unit 82 perform course control processes on the train 30a to which these units belong but do not perform course control processes on the other trains 30b to 30n.

Like the information acquisition unit 61, the information acquisition unit 81 acquires train information from the ground control device 21 and device information indicating the state of the on-board devices 10 of the other trains 30 and the state of the wireless devices 20 via the wireless devices 20 and the wireless communication unit 11, and stores them in the storage unit 70. The information acquisition unit 81 can also acquire device information indicating the state of the on-board devices 10 of the other trains 30 and the position information on the other trains 30 from the on-board devices 10 of the other trains 30 via the wireless devices 20 and the wireless communication unit 11, and store them in the storage unit 70.

Like the course control unit 62, the course control unit 82 can generate course control information for controlling the course of the train 30a and execute course control processes that are based on the course control information. The course control processes are similar to those according to the first to third embodiments, except for steps S10 and S13 illustrated in FIG. 14. Note that the course control unit 82 can further have some of the functions of the interlocking control device 23 and the ground control device 21 according to the first to third embodiments. Specifically, the course control unit 82 can generate the above-described train control information on the basis of the course control information. Like the train control unit 12 according to the first to third embodiments, the train control unit 12 according to the fourth embodiment performs processing according to the train control information.

The course control unit 82 can transmit a control request for the course necessary for the operation of the train 30 to the operation management device 22 via the ground control device 21. The operation management device 22 transmits the course control information to the interlocking control device 23 on the basis of the control request from the on-board device 10. On the basis of the course control information from the operation management device 22, the interlocking control device 23 locks or unlocks a turnout switch (not illustrated) to form the course of the train 30.

The course processing unit 84 performs the process of determining whether a course control process for the departure course of the train 30a is necessary, instead of the determination process of step S10 illustrated in FIG. 14. In response to determining that a course control process for the departure course of the train 30a is necessary, the course processing unit 84 selects in step S11 the route of the train 30a on the basis of the current position information and travel route information on the train 30a.

The course processing unit 84 also performs the process of determining whether a course control process for an in-premise course is necessary for the train 30a instead of the determination process of step S13 illustrated in FIG. 14. In response to determining that a course control process for an in-premise course is necessary for the train 30a, the course processing unit 84 selects in step S14 the route of the train 30a on the basis of the current position information and travel route information on the train 30a.

Like the determination unit 63, the determination unit 83 determines whether a departure restriction condition and an entry restriction condition are satisfied. In response to the determination unit 83 determining that a departure restriction condition is satisfied, the course processing unit 84, like the course processing unit 64, prevents the train 30a from proceeding to the departure course. In response to the determination unit 83 determining that an entry restriction condition is satisfied, the course processing unit 84, like the course processing unit 64, prevents the train 30a from entering the in-premise course of the second station 93.

Regarding the process of causing the interlocking control device 23 to control turnout switches (not illustrated) that form the course of the train 30, the course processing unit 64 according to the first to third embodiments transmits course control information to the interlocking control device 23. However, the course processing unit 84 is different from the course processing unit 64 in that it transmits a control request to the operation management device 22 via the ground control device 21 as described above.

Instead of transmitting a control request to the operation management device 22 via the ground control device 21 and generating train control information on the basis of course control information, the course processing unit 84 can transmit course control information to the interlocking control device 23 via the ground control device 21. In this case, the interlocking control device 23 and the ground control device 21 perform the same processing as in the first to third embodiments. Specifically, the interlocking control device 23 generates the above-described signal information on the basis of the course control information received from the on-board device 10, and outputs the signal information to the ground control device 21. The ground control device 21 generates train control information on the basis of the signal information from the interlocking control device 23, and transmits, via the wireless device 20, the generated train control information to the on-board device 10 that has transmitted the course control information. As in the first to third embodiments, the train control unit 12 of the on-board device 10 receives the train control information via the wireless communication unit 11, and performs processing according to the received train control information.

The on-board device 10 according to the fourth embodiment has the hardware configuration illustrated in FIG. 18. As illustrated in FIG. 18, the on-board device 10 includes the processor 201, the memory 202, and the interface circuit 203. The processor 201, the memory 202, and the interface circuit 203 can exchange data with one another via the bus 204. In the on-board device 10, the route information storage unit 71, the schedule information storage unit 72, the train information storage unit 73, and the device information storage unit 74 are realized by the memory 202. The wireless communication unit 11 is realized by the interface circuit 203.

The processor 201 executes the functions of the information acquisition unit 81 and the course control unit 82 by reading and executing a course control program stored in the memory 202. Note that part or all of the information acquisition unit 81 and the course control unit 82 can be configured by hardware typified by an application specific integrated circuit (ASIC) and a field programmable gate array (FPGA). In other words, the processing circuit for realizing part or all of the information acquisition unit 81 and the course control unit 82 may be dedicated hardware.

As described above, the on-board device 10 according to the fourth embodiment is mounted in the control target train 30a traveling on the track 90 of a line including a plurality of stations, and controls the course of the control target train 30a. Thus, the on-board device 10 according to the fourth embodiment functions as a course control device. The on-board device 10 includes the wireless communication unit 11 that performs wireless communication with the plurality of wireless devices 20, the information acquisition unit 81 that acquires information from the wireless devices 20 via the wireless communication unit 11, and the course control unit 82 that controls the course of the control target train 30a on the basis of the information acquired by the information acquisition unit 81. The course control unit 82 prevents the control target train 30a from proceeding to the course in at least one of a case where at least one of the plurality of wireless devices 20 is in a failure state, a case where the on-board device 10 that is mounted in a preceding train preceding the control target train 30a on the track 90 and controls the preceding train on the basis of the train control information acquired via the wireless devices 20 is in a failure state, and a case where the preceding train is in a stationary state in the inter-station region 92. Therefore, it is possible to prevent the train 30 from at least one of staying between stations and staying in the premises of a station. Since the on-board device 10 according to the fourth embodiment does not perform course control processes on any trains other than the train 30 to which the on-board device 10 belongs, the on-board device 10 can achieve better load dispersion than the course control device 26 according to the first to third embodiments.

Other Embodiments

Note that the on-board device 10 and the course control device 26 can cooperate to perform course control processes. Specifically, some of the course control processes may be executed by the course control device 26, and the other course control processes may be executed by the on-board device 10. Thus, two or more devices including the course control device 26 and the on-board device 10 may be configured to function as a course control device. In other words, the wireless train control system 1 only needs to be able to execute course control processes for each train 30 in its entirety, and the above-described processes are not limitations.

In addition to the above-mentioned departure restriction process, the course processing unit 64 of the course control device 26 according to the first to third embodiments can prevent a stationary train 30 at the first station 91 from departing from the first station 91 toward the second station 93 in response to the on-board device 10 of the train 30 outputting an abnormality notification. The train control unit 12 of the on-board device 10 can output information indicating an abnormality notification to the wireless device 20 through wireless communication, for example, when the operation of the train control unit 12 becomes unstable due to a failure, when the train 30 is expected to stop halfway if the train 30 leaves, or when another abnormality occurs in the train 30. In response to acquiring information indicating an abnormality notification via the wireless device 20 and the ground control device 21, the course processing unit 64 of the course control device 26 prevents the train 30 that has output the abnormality notification from departing from the first station 91 toward the second station 93 in the same manner as in the above-mentioned departure restriction process.

The above-described embodiments provide the three separate devices: the ground control device 21, the course control device 26, and the interlocking control device 23. Alternatively, the functions of the ground control device 21 and the interlocking control device 23 may be added to the course control device 26 without providing the ground control device 21 and the interlocking control device 23.

In the above-described embodiments, the course processing unit 64 or 84 performs course restriction in at least one of a case where the on-board device 10 has failed and a case where the wireless device 20 has failed. Alternatively, the course processing unit 64 or 84 may perform course restriction in at least one of a case where there is a possibility of failure of the on-board device 10 and a case where there is a possibility of failure of the wireless device 20. Whether there is a possibility of failure of the on-board device 10 and the wireless device 20 is determined by the determination unit 63 or 83 on the basis of the state of the on-board device 10.

The configurations described in the above-mentioned embodiments indicate examples of an aspect of the present invention. The configurations can be combined with another well-known technique, and part of the configurations can be omitted or changed in a range not departing from the gist of the present invention.

REFERENCE SIGNS LIST 1 wireless train control system; 1RA, 1RB in-premise course; 1SA, 1SB departure course; 10 on-board device; 11 wireless communication unit; 12 train control unit; 20, 20a to 20h wireless device; 21 ground control device; 22 operation management device; 23 interlocking control device; 24, 25 network; 26 course control device; 30, 30a to 30n train; 41 communication unit; 42, 70 storage unit; 43, 80 control unit; 51, 71 route information storage unit; 52, 72 schedule information storage unit; 53, 73 train information storage unit; 54, 74 device information storage unit; 61, 81 information acquisition unit; 62, 82 course control unit; 63, 83 determination unit; 64, 84 course processing unit; 75 route information table; 76 wireless device information table; 77 device state information table; 90 track; 91 first station; 92 inter-station region; 93 second station; 201 processor; 202 memory; 203 interface circuit.

The invention claimed is:

1. A course control device that controls a course of a course control target train traveling on a track, the course control device comprising:
   an information obtainer to acquire information via any of a plurality of wireless devices arranged along a track from a first station to a second station; and
   a course controller to control the course of the course control target train on a basis of the information acquired by the information obtainer, wherein
   the information obtainer acquires device information indicating a state of one or more wireless devices whose wireless communication range includes an in-premise course of the second station included in a route of the course control target train among the plurality of wireless devices,
   the course controller includes:
   a determiner to determine, on a basis of the device information acquired by the information obtainer, whether the one or more wireless devices are in a failure state; and
   a course processor to prevent the course control target train from proceeding to the in-premise course in response to the determiner determining that the one or more wireless devices are in a failure state,
   the second station includes two or more in-premise courses,
   two or more of the plurality of wireless devices have wireless communication ranges including different in-premise courses at the second station, and
   in a case where the one or more wireless devices are in a failure state, if an in-premise course located within the wireless communication range of a wireless device other than the one or more wireless devices among the two or more of the plurality of wireless devices is available, the course processor changes the in-premise course of the second station to which the course control target train proceeds, and allows the course control target train to proceed to the in-premise course after the change.

2. The course control device according to claim 1, wherein
the information obtainer acquires, via any of the plurality of wireless devices, position information on each train wirelessly transmitted from an on-board device mounted in each train, the each train being the course control target train, and
the course controller controls a course of the each train on a basis of the position information acquired by the information obtainer.

3. A wireless train control system comprising:
the course control device according to claim 1;
an on-board device mounted in each train;
the plurality of wireless devices; and
a ground control device to exchange information with the on-board device via the plurality of wireless devices, wherein
the course control device acquires position information on the train via two or more devices including the wireless devices and the ground control device, and on a basis of the position information, transmits information for controlling the course of the course control target train to the on-board device via two or more devices including the ground control device and the wireless devices.

4. A course control device that controls a course of a course control target train traveling on a track, the course control device comprising:
an information obtainer to acquire information via any of a plurality of wireless devices arranged along a track from a first station to a second station; and
a course controller to control the course of the course control target train on a basis of the information acquired by the information obtainer, wherein
the course controller prevents the course control target train from proceeding to the course in at least one of a case where at least one of the plurality of wireless devices is in a failure state, a case where an on-board device that is mounted in a preceding train preceding the course control target train on the track and controls the preceding train on a basis of information acquired via the wireless devices is in a failure state, and a case where the preceding train is in a stationary state between the first station and the second station, and
on a basis of at least one type of state selected from among the failure state of the wireless devices, the failure state of the on-board device that controls the preceding train, and the stationary state of the preceding train, the course controller sets a period during which the course control target train is prevented from proceeding to the course.

5. The course control device according to claim 4, wherein
the information obtainer acquires, via any of the plurality of wireless devices, position information on each train wirelessly transmitted from an on-board device mounted in each train, the each train being the course control target train, and
the course controller controls a course of the each train on a basis of the position information acquired by the information obtainer.

6. A wireless train control system comprising:
the course control device according to claim 4;
an on-board device mounted in each train;
the plurality of wireless devices; and
a ground control device to exchange information with the on-board device via the plurality of wireless devices, wherein
the course control device acquires position information on the train via two or more devices including the wireless devices and the ground control device, and on a basis of the position information, transmits information for controlling the course of the course control target train to the on-board device via two or more devices including the ground control device and the wireless devices.

7. A course control device that controls a course of a course control target train traveling on a track, the course control device comprising:
an information obtainer to acquire information via any of a plurality of wireless devices arranged along a track from a first station to a second station; and
a course controller to control the course of the course control target train on a basis of the information acquired by the information obtainer, wherein
the course controller prevents the course control target train from proceeding to a departure course at the first station toward the second station in a case where one or more wireless devices arranged at the second station among the plurality of wireless devices are in a failure state.

8. The course control device according to claim 7, wherein
the information obtainer acquires device information indicating a state of the wireless devices, and
the course controller includes:
a determiner to determine, on a basis of the device information acquired by the information obtainer, whether the one or more wireless devices among the plurality of wireless devices are in a failure state; and
a course processor to prevent the course control target train from proceeding to a departure course at the first station toward the second station in response to the determiner determining that the one or more wireless devices are in a failure state.

9. The course control device according to claim 7, wherein
the information obtainer acquires, via any of the plurality of wireless devices, position information on each train wirelessly transmitted from an on-board device mounted in each train, the each train being the course control target train, and
the course controller controls a course of the each train on a basis of the position information acquired by the information obtainer.

10. A wireless train control system comprising:
the course control device according to claim 7;
an on-board device mounted in each train;
the plurality of wireless devices; and
a ground control device to exchange information with the on-board device via the plurality of wireless devices, wherein
the course control device acquires position information on the train via two or more devices including the wireless devices and the ground control device, and on a basis of the position information, transmits information for controlling the course of the course control target train to the on-board device via two or more devices including the ground control device and the wireless devices.

11. A course control device that controls a course of a course control target train traveling on a track, the course control device comprising:
an information obtainer to acquire information via any of a plurality of wireless devices arranged along a track from a first station to a second station; and
a course controller to control the course of the course control target train on a basis of the information acquired by the information obtainer, wherein
the course controller prevents the course control target train from proceeding to a departure course at the first station toward the second station in a case where an on-board device is in a failure state, the on-board device being mounted in a preceding train preceding the course control target train on the track and located at the second station, the on-board device being configured to control the preceding train on a basis of information acquired via the wireless devices.

12. The course control device according to claim 11, wherein
the information obtainer acquires device information indicating a state of the on-board device of the preceding train, and
the course controller includes:
a determiner to determine, on a basis of the device information acquired by the information obtainer, whether the on-board device of the preceding train is in a failure state; and
a course processor to prevent the course control target train from proceeding to a departure course at the first station toward the second station in response to the determiner determining that the on-board device of the preceding train is in a failure state.

13. The course control device according to claim 11, wherein
the information obtainer acquires, via any of the plurality of wireless devices, position information on each train wirelessly transmitted from an on-board device mounted in each train, the each train being the course control target train, and
the course controller controls a course of the each train on a basis of the position information acquired by the information obtainer.

14. A wireless train control system comprising:
the course control device according to claim 11;
an on-board device mounted in each train;
the plurality of wireless devices; and
a ground control device to exchange information with the on-board device via the plurality of wireless devices, wherein
the course control device acquires position information on the train via two or more devices including the wireless devices and the ground control device, and on a basis of the position information, transmits information for controlling the course of the course control target train to the on-board device via two or more devices including the ground control device and the wireless devices.

15. An on-board device that is mounted in a course control target train traveling on a track and controls a course of the course control target train, the on-board device comprising:
a wireless communicator to perform wireless communication with a plurality of wireless devices arranged along a track from a first station to a second station;
an information obtainer to acquire information via the wireless communicator; and
a course controller to control the course of the course control target train on a basis of the information acquired by the information obtainer, wherein
the information obtainer acquires device information indicating a state of one or more wireless devices whose wireless communication range includes an in-premise course of the second station included in a route of the course control target train among the plurality of wireless devices,
the course controller includes:
a determiner to determine, on a basis of the device information acquired by the information obtainer, whether the one or more wireless devices are in a failure state; and
a course processor to prevent the course control target train from proceeding to the in-premise course in response to the determiner determining that the one or more wireless devices are in a failure state,
the second station includes two or more in-premise courses,
two or more of the plurality of wireless devices have wireless communication ranges including different in-premise courses at the second station, and
in a case where the one or more wireless devices are in a failure state, if an in-premise course located within the wireless communication range of a wireless device other than the one or more wireless devices among the two or more of the plurality of wireless devices is available, the course processor changes the in-premise course of the second station to which the course control target train proceeds, and allows the course control target train to proceed to the in-premise course after the change.

16. An on-board device that is mounted in a course control target train traveling on a track, the on-board device being configured to control a course of the course control target train, the on-board device comprising:
a wireless communicator to perform wireless communication with a plurality of wireless devices arranged along a track from a first station to a second station;
an information obtainer to acquire information via the wireless communicator; and
a course controller to control the course of the course control target train on a basis of the information acquired by the information obtainer, wherein
the course controller prevents the course control target train from proceeding to the course in at least one of a case where at least one of the plurality of wireless devices is in a failure state, a case where an on-board device that is mounted in a preceding train preceding the course control target train on the track and controls the preceding train on a basis of information acquired via the wireless devices is in a failure state, and a case where the preceding train is in a stationary state between the first station and the second station, and
on a basis of at least one type of state selected from among the failure state of the wireless devices, the failure state of the on-board device that controls the preceding train, and the stationary state of the preceding train, the course controller sets a period during which the course control target train is prevented from proceeding to the course.

17. An on-board device that is mounted in a course control target train traveling on a track and controls a course of the course control target train, the on-board device comprising:

a wireless communicator to perform wireless communication with a plurality of wireless devices arranged along a track from a first station to a second station;
an information obtainer to acquire information via the wireless communicator; and
a course controller to control the course of the course control target train on a basis of the information acquired by the information obtainer, wherein
the course controller prevents the course control target train from proceeding to a departure course at the first station toward the second station in a case where one or more wireless devices arranged at the second station among the plurality of wireless devices are in a failure state.

18. The on-board device according to claim 17, wherein the information obtainer acquires device information indicating a state of the wireless devices, and
the course controller includes:
a determiner to determine, on a basis of the device information acquired by the information obtainer, whether the one or more wireless devices among the plurality of wireless devices are in a failure state; and
a course processor to prevent the course control target train from proceeding to a departure course at the first station toward the second station in response to the determiner determining that the one or more wireless devices are in a failure state.

19. An on-board device that is mounted in a course control target train traveling on a track and controls a course of the course control target train, the on-board device comprising:
a wireless communicator to perform wireless communication with a plurality of wireless devices arranged along a track from a first station to a second station;
an information obtainer to acquire information via the wireless communicator; and
a course controller to control the course of the course control target train on a basis of the information acquired by the information obtainer, wherein
the course controller prevents the course control target train from proceeding to a departure course at the first station toward the second station in a case where an on-board device is in a failure state, the on-board device being mounted in a preceding train preceding the course control target train on the track and located at the second station, the on-board device being configured to control the preceding train on a basis of information acquired via the wireless devices.

20. The on-board device according to claim 19, wherein the information obtainer acquires device information indicating a state of the on-board device of the preceding train, and
the course controller includes:
a determiner to determine, on a basis of the device information acquired by the information obtainer, whether the on-board device of the preceding train is in a failure state; and
a course processor to prevent the course control target train from proceeding to a departure course at the first station toward the second station in response to the determiner determining that the on-board device of the preceding train is in a failure state.

21. A course control method for controlling a course of a course control target train traveling on a track, the course control method comprising:
information acquisition of acquiring information via any of a plurality of wireless devices arranged along a track from a first station to a second station; and
course control of controlling the course of the course control target train on a basis of the information acquired by the information acquisition, wherein
the information acquisition includes acquiring device information indicating a state of one or more wireless devices whose wireless communication range includes an in-premise course of the second station included in a route of the course control target train among the plurality of wireless devices,
the course control includes:
determination of determining, on a basis of the device information acquired by the information acquisition, whether the one or more wireless devices are in a failure state; and
course processing of preventing the course control target train from proceeding to the in-premise course in response to determining by the determination that the one or more wireless devices are in a failure state,
the second station includes two or more in-premise courses,
two or more of the plurality of wireless devices have wireless communication ranges including different in-premise courses at the second station, and
the course processing includes, in a case where the one or more wireless devices are in a failure state and if an in-premise course located within the wireless communication range of a wireless device other than the one or more wireless devices among the two or more of the plurality of wireless devices is available, changing the in-premise course of the second station to which the course control target train proceeds and allowing the course control target train to proceed to the in-premise course after the change.

22. A course control method for controlling a course of a course control target train traveling on a track, the course control method comprising:
information acquisition of acquiring information via any of a plurality of wireless devices arranged along a track from a first station to a second station; and
course control of controlling the course of the course control target train on a basis of the information acquired by the information acquisition, wherein
the course control includes preventing the course control target train from proceeding to the course in at least one of a case where at least one of the plurality of wireless devices is in a failure state, a case where an on-board device that is mounted in a preceding train preceding the course control target train on the track and controls the preceding train on a basis of information acquired via the wireless devices is in a failure state, and a case where the preceding train is in a stationary state between the first station and the second station, and
the course control includes setting a period during which the course control target train is prevented from proceeding to the course on a basis of at least one type of state selected from among the failure state of the wireless devices, the failure state of the on-board device that controls the preceding train, and the stationary state of the preceding train.

23. A course control method for controlling a course of a course control target train traveling on a track, the course control method comprising:
information acquisition of acquiring information via any of a plurality of wireless devices arranged along a track from a first station to a second station; and course control of controlling the course of the course control target train on a basis of the information acquired by the information acquisition, wherein the course control includes preventing the course control target train from proceeding to a departure course at the first station toward the second station in a case where one or more wireless devices arranged at the second station among the plurality of wireless devices are in a failure state.

24. The course control method according to claim 23, wherein the information acquisition includes acquiring device information indicating a state of the wireless devices, and the course control includes:

determination of determining, on a basis of the device information acquired by the information acquisition, whether the one or more wireless devices among the plurality of wireless devices are in a failure state; and course processing of preventing the course control target train from proceeding to a departure course at the first station toward the second station in response to determining by the determination that the one or more wireless devices are in a failure state.

25. A course control method for controlling a course of a course control target train traveling on a track, the course control method comprising:

information acquisition of acquiring information via any of a plurality of wireless devices arranged along a track from a first station to a second station; and course control of controlling the course of the course control target train on a basis of the information acquired by the information acquisition, wherein the course control includes preventing the course control target train from proceeding to a departure course at the first station toward the second station in a case where an on-board device is in a failure state, the on-board device being mounted in a preceding train preceding the course control target train on the track and located at the second station, the on-board device being configured to control the preceding train on a basis of information acquired via the wireless devices.

26. The course control method according to claim 25, wherein the information acquisition includes acquiring device information indicating a state of the on-board device of the preceding train, and the course control includes:

determination of determining, on a basis of the device information acquired by the information acquisition, whether the on-board device of the preceding train is in a failure state; and course processing of preventing the course control target train from proceeding to a departure course at the first station toward the second station in response to determining by the determination that the on-board device of the preceding train is in a failure state.

* * * * *